(12) United States Patent
Ichihara et al.

(10) Patent No.: US 11,032,533 B2
(45) Date of Patent: Jun. 8, 2021

(54) IMAGE PROCESSING APPARATUS, IMAGE CAPTURING APPARATUS, IMAGE PROCESSING METHOD, AND STORAGE MEDIUM

(71) Applicant: CANON KABUSHIKI KAISHA, Tokyo (JP)

(72) Inventors: Ko Ichihara, Toride (JP); Chiaki Inoue, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 398 days.

(21) Appl. No.: 15/591,644

(22) Filed: May 10, 2017

(65) Prior Publication Data
US 2017/0332067 A1 Nov. 16, 2017

(30) Foreign Application Priority Data
May 16, 2016 (JP) .............................. JP2016-097981

(51) Int. Cl.
*H04N 13/25* (2018.01)
*H04N 13/243* (2018.01)
(Continued)

(52) U.S. Cl.
CPC ........... *H04N 13/25* (2018.05); *G06K 9/3233* (2013.01); *G06K 9/6211* (2013.01);
(Continued)

(58) Field of Classification Search
CPC ....... G06K 2009/6213; G06K 2209/27; G06K 9/3233; G06K 9/6211; G06K 9/6215; G06K 9/6218
(Continued)

(56) References Cited

U.S. PATENT DOCUMENTS 7,778,328 B2 * 8/2010 Vedula ................. H04N 19/597
375/240.12
9,386,223 B2 7/2016 Matsumoto et al.
(Continued)

FOREIGN PATENT DOCUMENTS

CN 101563709 A 10/2009
CN 104299228 A 1/2015
(Continued)

OTHER PUBLICATIONS

Achanta et al., "SLIC Superpixels Compared to State-of-the-Art Superpixel Methods", IEEE Transactions on Pattern Analysis and Machine Intelligence, vol. 34, Issue 11, Nov. 2012, pp. 2274-2281.
(Continued)

*Primary Examiner* — Nasser M Goodarzi
*Assistant Examiner* — Jaycee Imperial
(74) *Attorney, Agent, or Firm* — Rossi, Kimms & McDowell LLP

(57) ABSTRACT

An image processing apparatus processes a first image and a second image so as to detect a corresponding pixel in the second image which corresponds to a target pixel in the first image. The first image has a first parameter value, and the second image has a second parameter value different from the first parameter value. The first parameter value and the second parameter value are values of optical parameters of image capturing systems used to capture the first image and the second image. The image processing apparatus includes an area setter that sets a two-dimensional search area as a partial area in which the corresponding pixel is to be searched in the second image, based on a predetermined range in which each of the first and second parameter values can change, and a detector that detects the corresponding pixel by searching the two-dimensional search area.

11 Claims, 11 Drawing Sheets

(51) Int. Cl.
*H04N 13/282* (2018.01)
*H04N 5/232* (2006.01)
*G06T 7/00* (2017.01)
*G06T 7/593* (2017.01)
*G06T 7/11* (2017.01)
*G06T 7/174* (2017.01)
*G06K 9/32* (2006.01)
*G06K 9/62* (2006.01)
*H04N 13/00* (2018.01)

(52) U.S. Cl.
CPC ......... *G06K 9/6215* (2013.01); *G06K 9/6218* (2013.01); *G06T 7/11* (2017.01); *G06T 7/174* (2017.01); *G06T 7/596* (2017.01); *G06T 7/97* (2017.01); *H04N 5/23212* (2013.01); *H04N 5/232133* (2018.08); *H04N 13/243* (2018.05); *H04N 13/282* (2018.05); *G06K 2009/6213* (2013.01); *G06K 2209/27* (2013.01); *G06T 2207/10021* (2013.01); *G06T 2207/10028* (2013.01); *G06T 2207/20221* (2013.01); *H04N 2013/0081* (2013.01); *H04N 2013/0088* (2013.01)

(58) Field of Classification Search
USPC .......................................................... 348/48
See application file for complete search history.

(56) References Cited

U.S. PATENT DOCUMENTS

| | | | | |
|---|---|---|---|---|
| 2004/0189875 | A1* | 9/2004 | Zhai | H04N 9/78 348/669 |
| 2006/0067663 | A1* | 3/2006 | Kita | G02B 3/14 396/72 |
| 2008/0317379 | A1* | 12/2008 | Steinberg | G06K 9/00248 382/275 |
| 2010/0066843 | A1* | 3/2010 | Muramatsu | G01S 3/7865 348/208.14 |
| 2012/0293633 | A1* | 11/2012 | Yamato | G01C 11/06 348/47 |
| 2013/0223712 | A1* | 8/2013 | Kobayashi | G06T 11/003 382/131 |
| 2013/0342641 | A1 | 12/2013 | Morioka et al. | |
| 2015/0078669 | A1* | 3/2015 | Ukil | G06K 9/00234 382/201 |
| 2015/0279016 | A1 | 10/2015 | Kim | |
| 2016/0191759 | A1* | 6/2016 | Somanath | H04N 5/23212 348/349 |

FOREIGN PATENT DOCUMENTS

| | | |
|---|---|---|
| CN | 104392457 A | 3/2015 |
| CN | 104717476 A | 6/2015 |
| CN | 104966281 A | 10/2015 |
| JP | 2000028355 A | 1/2000 |
| JP | 2002027495 A | 1/2002 |
| JP | 2010103949 A | 5/2010 |
| JP | 2014017539 A | 1/2014 |
| JP | 2015103885 A | 6/2015 |
| WO | 2011096251 A1 | 8/2011 |

OTHER PUBLICATIONS

European Search Report issued in European Appln. No. 17170984.3 dated Oct. 25, 2017.
"Zoom Lens." Wikipedia. Jan. 24, 2011: 1-5. Web. Mar. 14, 2016. Cited in NPL 1.
"Epipolar Geometry." Wikipedia. Mar. 23, 2016: 1-4. Web. Oct. 18, 2017. Cited in NPL 1.
Office Action issued in Chinese Application No. 201710332926.4 dated Nov. 1, 2019. English translation provided.
Office Action issued in Japanese Appln. No. 2016-097981 dated Jan. 21, 2020. English translation provided.
Office Action issued in European Appln. No. 171709843 dated Apr. 15, 2021.
Hartley. "Epipolar Geometry and the Fundamental Matrix." Multiple View Geometry in Computer Vision—Second Edition. Mar. 31, 2004: 239-261.

* cited by examiner

IMAGE PROCESSING APPARATUS, IMAGE CAPTURING APPARATUS, IMAGE PROCESSING METHOD, AND STORAGE MEDIUM

BACKGROUND OF THE INVENTION

Field of the Invention

The present invention relates to an image processing technology for detecting corresponding points in a plurality of images having different optical parameters used to capture these images.

Description of the Related Art

By detecting corresponding points as pixels for the same object in a plurality of images that have different optical parameters used to capture these images, a distance to the object (object distance) in an object space can be calculated and the plurality of images can be combined based on the corresponding relationship of the positions of the corresponding points.

For example, a stereo camera that can capture images from a plurality of different viewpoints can calculate a parallax amount based on a coordinate difference amount of on each image of the corresponding points among the plurality of images captured at respective viewpoints, and calculate an object distance based on the parallax amount. Japanese Patent Laid-Open No. ("JP") 2015-103885 discloses a compound eye image capturing apparatus that includes a plurality of single focus capturing systems having different focal lengths and can obtain in-focus images with a plurality of different angles of view. This compound eye image capturing apparatus detects corresponding points in the plurality of images obtained by the plurality of image capturing systems, combines these images with one another, and calculates the object distance. JP 2014-017539 discloses an image capturing apparatus that aligns with one another a plurality of images having different focal lengths and captured at a plurality of focus positions, combines these images, and generates a deep focus (pan-focus) image.

In general, the corresponding points are detected by searching another search image for a corresponding pixel corresponding to an arbitrary target image in one base image (reference image) among a plurality of images. Moreover, the corresponding pixel is searched only on an epipolar line set (calculated) based on the optical parameters in the plurality of image capturing systems in the search image.

However, when the precise optical parameter is not known in each of the plurality of image capturing systems, a corresponding pixel may not be located on the epipolar line set in the search image based on the optical parameter. In this case, a search for the corresponding pixel only on the epipolar line would result in a failure of detecting the corresponding pixels or lower the detection precision of the corresponding pixels. On the other hand, when the corresponding pixel are searched for in the whole search image rather than the epipolar line, the processing load becomes excessively heavy.

SUMMARY OF THE INVENTION

The present invention provides an image processing apparatus, an image processing method, etc. which can detect corresponding points between a plurality of images with a reduced processing load, even when an optical parameter used to capture the images is not precisely known.

An image processing apparatus according to one aspect of the present invention is configured to process a first image and a second image so as to detect a corresponding pixel in the second image which corresponds to a target pixel in the first image. The first image and the second image are obtained by image capturing. The first image has a first parameter value, and the second image has a second parameter value different from the first parameter value. The first parameter value and the second parameter value are values of optical parameters of image capturing systems used to capture the first image and the second image. The image processing apparatus includes an area setter configured to set a two-dimensional search area as a partial area in which the corresponding pixel is to be searched in the second image, based on a predetermined range in which each of the first and second parameter values can change; and a detector configured to detect the corresponding pixel by searching the two-dimensional search area.

Further features of the present invention will become apparent from the following description of exemplary embodiments with reference to the attached drawings.

DESCRIPTION OF THE EMBODIMENTS

A description will now be given of embodiments of the present invention with reference to the accompanying drawings.

Prior to a description of concrete embodiments (a first embodiment to a fourth embodiment), a description will be given of a corresponding point detecting process (image processing method) configured to detect corresponding points as corresponding object in a plurality of images. The corresponding points are pixels for the same object in the plurality of images or pixels that record light from the same object. The corresponding point detection process according to this embodiment searches one search image (second image) for a corresponding pixel corresponding to an arbitrary target pixel in another base image (first image) in a plurality of images. While the following description assumes one target pixel and one corresponding pixel, a group of pixels or two or more pixels may be set to each of the target pixel and the corresponding pixel.

Figure 2:
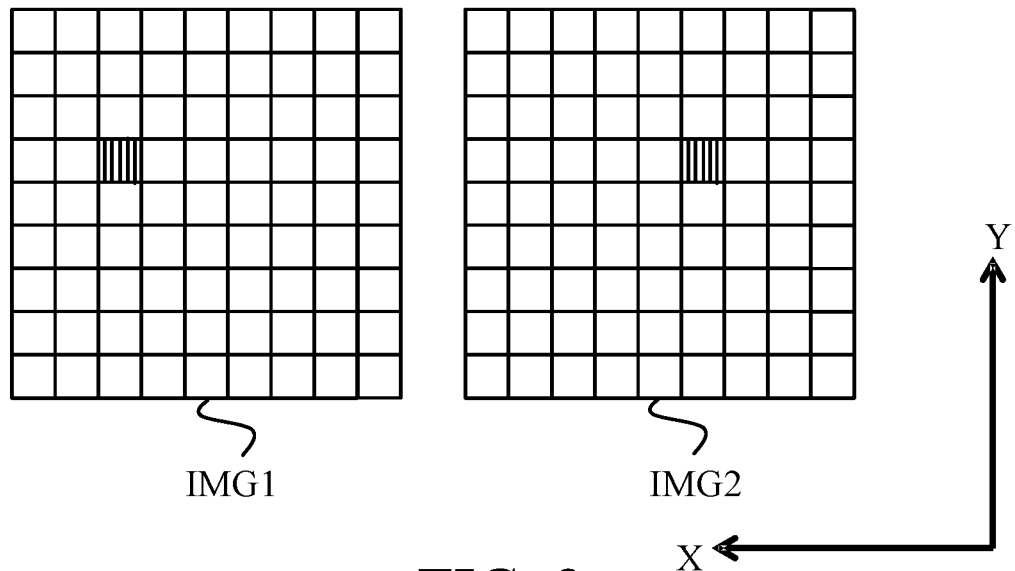
FIG. 2 is a view for explaining a block matching method.

FIG. 2 illustrates a first image IMG1 as a base image and a second image IMG2 as a search image, captured at different observing positions. A coordinate (X, Y) of a pixel position in each image is defined with an origin at a center of each image (pixel unit). X is a coordinate in a horizontal direction (X direction), and Y is a coordinate in a vertical direction (Y direction). F1(X, Y) is a signal value (pixel value) of a pixel located at a coordinate (X, Y) in the first image IMG1, and F2(X, Y) is a signal value (pixel value) of a pixel located at a coordinate (X, Y) in the second image IMG2.

The corresponding pixel in the second image IMG2 corresponding to the arbitrary target pixel (pixel value F1(X, Y)) in the first image IMG1 can be detected by searching a pixel value most similar to the pixel value F1(X, Y) in the second pixel IMG2. In FIG. 2, hatched images in the first and second images IMG1 and IMG2 are the target and corresponding pixels, respectively. In the following description, the target image will be referred to as an addressed image, and the corresponding image will be referred to as an addressed corresponding image.

A so-called block matching method is used to search the second image IMG2 for the pixel most similar to the arbitrary pixel in the first image IMG 1. A description will now be given of the block matching method when a block has a size of 3×1 pixels. Three pixel values of the arbitrary target pixel (coordinate (X, Y)), and the two pixels (left and right coordinates (X−1, Y) and (X+1, Y)) in the first image IMG1 are F1(X, Y), F1(X−1, Y), and F1(X+1, Y). Pixel values of pixels in the second image IMG2 that shifts from the coordinate (X, Y) by k in the X direction are F2(X+k, Y), F2(X+k−1, Y), and F2(X+k+1, Y). In this case, the similarity E of the pixel value between the addressed pixel located at the coordinate (X, Y) in the first image IMG1 and the pixel located at the coordinate (X+k, Y) in the second image IMG2 is defined as the following expression (1):

$$E = [F1(X, Y) - F2(X+k, Y)]^2 + \qquad (1)$$
$$[F1(X-1, Y) - F2(X+k-1, Y)]^2 +$$
$$[F1(X+1, Y) - F2(X+k+1, Y)]^2 =$$
$$\sum_{j=-1}^{1} [F1(X+j, Y) - F2(X+k+j, Y)]^2$$

A value of the similarity E is calculated by sequentially changing a value of k in this expression (1), and the coordinate (X+k, Y) that minimizes the similarity E is a coordinate of the addressed corresponding pixel in the second image IMG2 corresponding to the addressed pixel in the first image IMG1. A plurality of pixels used to calculate the similarity E or the above three pixel range will be referred to as a block. In the expression (1), the block has a range of three pixels in the X direction and one pixel in the Y direction, but the range may contain a plurality of pixels in the Y direction. A shape of the block is an arbitrary. In the expression (1), the similarity E is expressed by SSD (Sum of Squared Difference) that is a square sum of a pixel value difference, but may be expressed by SAD (Sum of Absolute Difference). Alternatively, the similarity E may be expressed by NCC (Normalized Cross-Correlation), and the addressed corresponding pixel is set to a pixel that provides the similarity closest to 1. Thus, a process that searches the coordinate (X+k, Y) of the addressed corresponding pixel that provides the minimum similarity E by sequentially changing k will be referred to as a search for the addressed corresponding pixel (or detection of the corresponding point). While this embodiment calculates the similarity E by sequentially changing the coordinate only in the X direction, another embodiment may calculate the similarity E by sequentially changing the coordinate only in the Y direction (at least one of the X direction and the Y direction). An area in the second image IMG2 in which the addressed corresponding pixel is searched will be referred to as a search area.

This corresponding point detection process provides (or detects) the coordinates at which the corresponding points (such as the addressed pixel and the addressed corresponding pixel) are located in the first and second images IMG1 and IMG2. Once the corresponding points are specified, information of the relative relationship of the coordinate (position) or the positional relationship between corresponding points can be obtained. The first and second images can be combined with each other to generate a combined image or a deep focus image based on the information on the positional relationship, and a distance to the object in the object space (or an object distance) can be calculated based on a positional difference between the corresponding points in the first and second images.

FIG. 2 illustrates that the coordinate of the addressed corresponding pixel in the second image IMG 2 shifts from the coordinate of the addressed image in the first image IMG 1 only in the X direction, or an epipolar line is parallel to the X direction. The epipolar line is a line on the image in which the addressed corresponding pixel can exist. In this case, the search may be performed along the epipolar line that extends in the X direction. Where N is the pixel number in the second image IMG2 in the X direction, the similarity E is calculated N times by sequentially changing a value of k. In order to search the second image IMG2 for the addressed corresponding pixel corresponding to each of the target pixel that is set to all pixels in the first image IMG1, the total calculation number becomes N×(N×M) times where M is the pixel number in the second image IMG2 in the Y direction.

In order to search only the linear search area for the addressed corresponding pixel, the precise optical parameter of the image capturing system when the first and second images IMG 1 and IMG 2 are captured is necessary. The optical parameter contains a focal length of an optical system in an image capturing system, a position of an entrance pupil in the optical system, a position of a front principal point in the optical system, a direction of an optical axis in the optical system, an in-focus distance, a positional difference between the center in the image sensor in the image capturing system and the optical axis in the optical system, and a rotating amount of the image sensor around the optical axis in the optical system. As illustrated in FIG. 2, when images are captured at different observing positions, the optical parameters contain a distance between the observing positions.

The position of the entrance pupil (referred to as an "entrance pupil position" hereinafter) in the optical parameter is a distance between an arbitrary reference plane orthogonal to the optical axis in the optical system to the entrance pupil in the optical system. The position of the front principal point (referred to as a "front principal point position" hereinafter) is a distance between an arbitrary reference plane orthogonal to the optical axis in the optical system to the front principal point in the optical system. An in-focus distance is a distance with which the optical system is focused on the object in capturing an image of the object.

Where at least one of the value of the optical parameter used to capture the first image (first parameter value) and the value of the optical parameter used to capture the second image (second parameter value) changes, the epipolar line changes in the search image for the same addressed pixel in the second image. This epipolar line change will be described later. Even when the epipolar line used to search the addressed corresponding pixel in the second image is set based on the optical parameter value different from the actual optical parameter value, the addressed corresponding pixel may not be found on the epipolar line and a false pixel may be erroneously detected as the addressed corresponding pixel. The erroneously detected, addressed corresponding pixel provides the minimum similarity E on the epipolar line, but records light from an object different from the object that emits light recorded by the addressed pixel.

Figure 3:
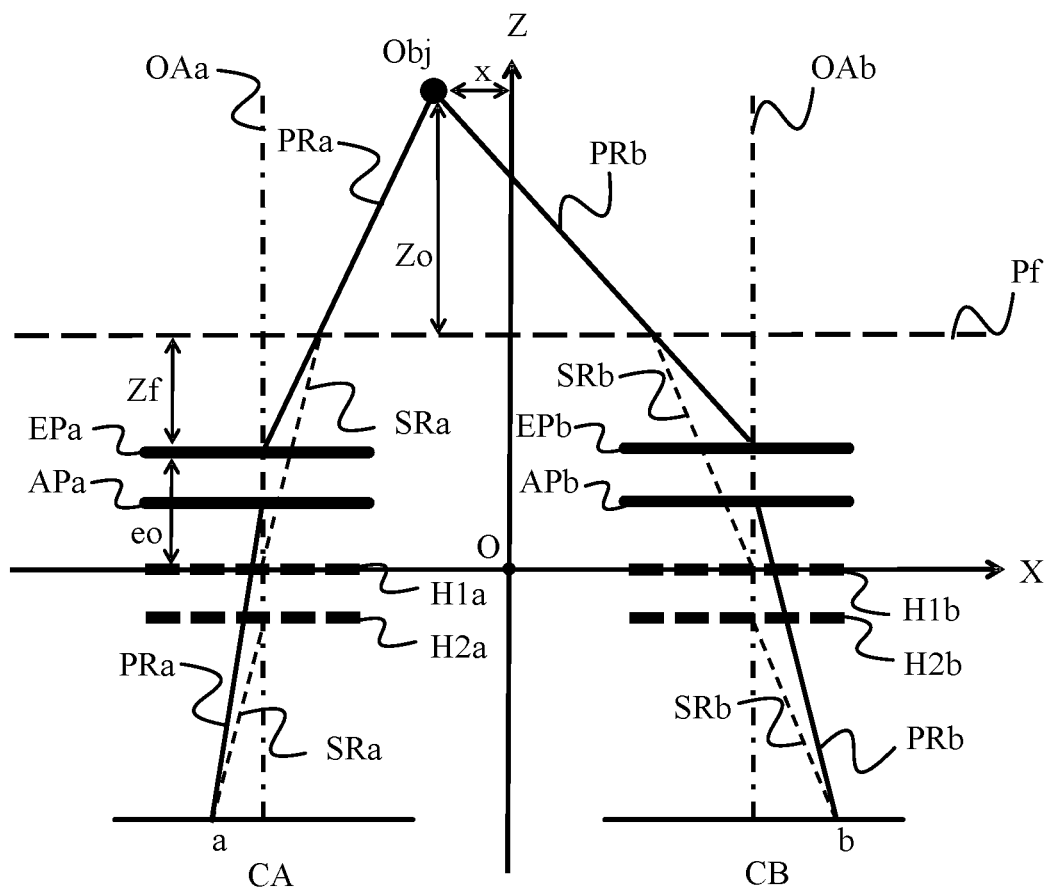
FIG. 3 is a view for explaining a corresponding relationship of coordinates on image capturing planes of the same object in two image capturing systems.

A description will now be given of a change of the epipolar line as the optical parameter changes. Now assume that images are captured through two image capturing systems from two different observing positions. Referring now to FIG. 3, a description will be given of epipolar lines where the two ideal imaging systems have the same optical parameter values other than the observing positions. CA and CB in FIG. 3 are the two image capturing systems having different observing positions. In FIG. 3, O is an origin, the horizontal direction is the X direction, and the vertical direction is the Y direction. Alternate long and short dash lines OAa and OAb are optical axes in the image capturing systems CA and CB, and Obj is an object. EPa and EPb are entrance pupils in the image capturing systems CA and CB, and APa and APb are exit pupils in the image capturing systems CA and CB. H1a and H1b are front principal plane in the imaging systems CA and CB, and H1a and H1b are back principal plane of the imaging systems CA and CB. Solid lines PRa and PRb are rays (referred to as "aperture center rays" hereinafter) that pass the center of the aperture stop in the optical systems in the imaging systems CA and CB among light rays entering the image capturing systems CA and CB from the object. Broken lines SRa and SRb are rays (referred to as "principal point rays" hereinafter) that pass the front and back principal points in the optical systems in the imaging systems CA and CB among light rays entering the image capturing systems CA and CB from the object.

Since the image capturing systems CA and AB have completely the same optical parameter values except for the observing position, the optical axes OAa and OAb are parallel to each other. The entrance pupils EPa and EPb are located at the same Z coordinate, the exit pupils APa and APb are located at the same Z coordinate, the front principal planes H1a and H1b are located at the same Z coordinate, and the back principal planes H2a and H2b are located at the same Z coordinate. In the image capturing systems CA, the front principal point as an intersection between the front principal plane H1a and the optical axis OAa has a coordinate (−D/2, 0). In the image capturing systems CB, the front principal point as an intersection between the front principal plane H1b and the optical axis OAb has a coordinate (+D/2, 0). In the image capturing systems CA, the intersection between the entrance pupil EPa and the optical axis OAa has a coordinate (−D/2, eo). In the image capturing systems CB, the intersection between the entrance pupil EPb and the optical axis OAb has a coordinate (+D/2, eo). In other words, a baseline length is D between the image capturing systems CA and CB, and a distance is eo in the Z-axis direction between the front principal planes H1a and H1b and the entrance pupils EPa and EPb.

A broken line Pf illustrates an in-focus plane as a plane on which the image capturing systems CA and CB are focused, and an in-focus distance as a distance in the Z-axis direction is Zf between the entrance pupil planes EPa and EPb and the in-focus plane Pf. A distance in the Z-axis direction is Zo between the in-focus plane Pf and the object Obj, and the object Obj is located at the coordinate (−x, eo+Zf+Zo).

Assume that "f" is a focal length in the image capturing systems CA and CB. Then, the coordinates "a" and "b" of the object image on the image capturing plane (image sensor) in each of the image capturing systems CA and CB satisfy the following expression (2). The coordinates "a" and "b" correspond to distances from the centers of the image capturing planes in the image capturing systems CA and CB (which the optical axes OAa and OAb pass).

$$b = a + \frac{(Z_f)}{(Z_f + Z_o)(Z_f + eo)} Df \quad (2)$$

This embodiment describes the relationship which the coordinates "a" and "b" satisfy in the two-dimensional space, but can extend this relationship to a three-dimensional space. Assume that a coordinate (X, Y) expresses a coordinate on the image capturing plane for each of the image capturing systems CA and CB. (ax, by) and (bx, by) are coordinates of the object images on the image capturing planes in the image capturing systems CA and CB, and Dx and Dy are components in the X and Y directions of the baseline length. Then, the expression (2) is established even when "ax" is substituted for "a," "bx" is substituted for "b," and "Dx" is substituted for "D." The expression (2) is also established even when "ay" is substituted for "a," "by" is substituted for "b," and "Dy" is substituted for "D."

In the expression (2), a line that connects the coordinate b1 with the coordinate b2 is an epipolar line when arbitrary different values Zo1 and Zo2 are substituted for Zo. Assume that the pixel located at the coordinate "a" is set to the addressed pixel. Then, the addressed corresponding pixel is located on the epipolar line.

Figure 4:
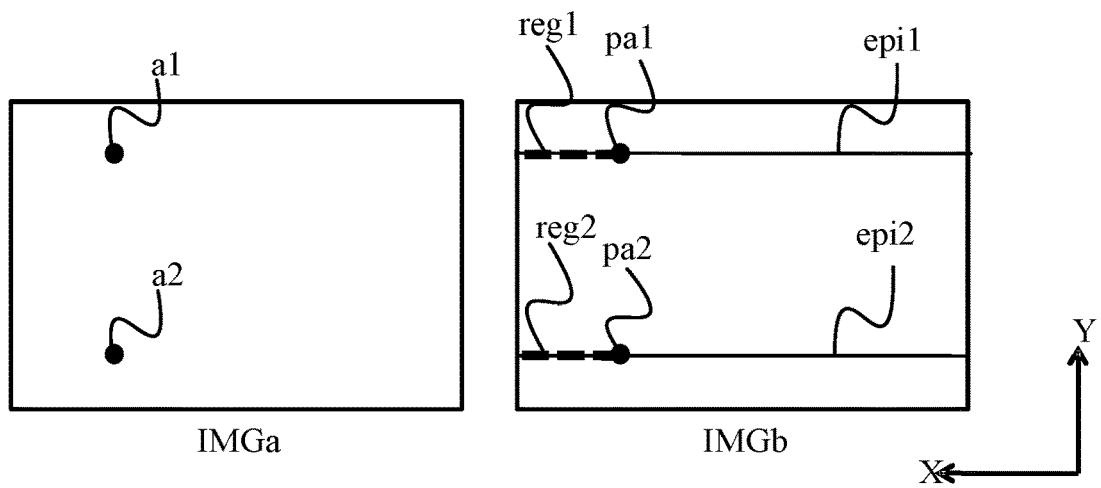
FIG. 4 illustrates epipolar lines on images obtained by the two image capturing systems illustrated in FIG. 3.

FIG. 4 illustrates the first and second images IMGa and IMGb obtained by the imaging systems CA and CB. In FIG. 4, the center of each image is set to the origin, and the vertical direction is the Y-axis direction, and the horizontal direction is the X-axis direction. A solid line epi1 illustrates an epipolar line in the second image IMGb where a pixel located at a point a1 in the first image IMGa is set to the addressed image, and the addressed corresponding pixel is located on the epipolar line epi1. A solid line epi2 illustrates an epipolar line in the second image IMGb where a pixel located at a point a2 in the first image IMGa is set to the addressed image, and the addressed corresponding pixel is located on the epipolar line epi2. Points pa1 and pa2 on the epipolar lines epi1 and epi2 denote pixels located at the same coordinates in the second image IMBb as the addressed pixels a1 and a2 in the first image IMBa.

The epipolar lines epi1 and epi2 may be searched in the second image IMGb so as to detect the addressed corresponding pixels corresponding to the addressed pixels a1 and a2. When a direction in which the image capturing system CB is located relative to the image capturing system CA or a baseline direction is known as an optical parameter, a direction in which the addressed corresponding pixel on the epipolar line relative to the same coordinate as the addressed pixel can be specified. In other words, for the same coordinate in the second image IMGb as that of the addressed pixel, the addressed corresponding pixel is always located in a direction reverse to the baseline direction. Thus, as illustrated by the broken lines reg1 and reg2 in the second image IMGb, a search area of the addressed corresponding pixel on each of the epipolar lines epi1 and epi2 can be limited based on the baseline direction.

Figure 5:
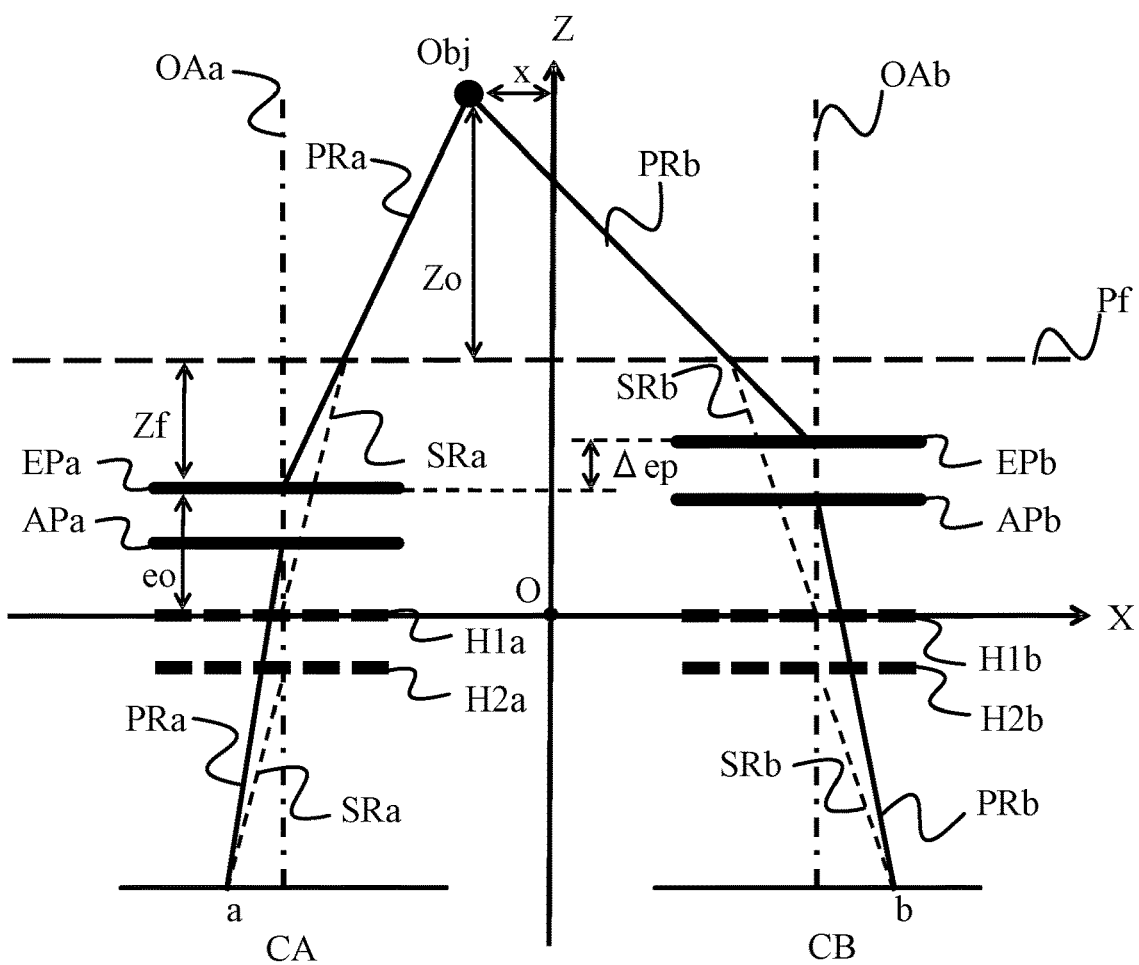
FIG. 5 is a view for explaining a corresponding relationship of coordinates on image capturing planes on the same object in the two image capturing systems having different entrance pupil positions.

Referring now to FIG. 5, a description will be given of the epipolar line when the two image capturing systems having different observing positions and different entrance pupil positions in the optical parameter (which is a distance from the plane orthogonal to the optical axes OAa and OAb to the entrance pupils EPa and EPb) are used. Common reference numerals in FIGS. 5 and 3 designate the same elements. In the two image capturing systems CA and CB in FIG. 5, a distance from the object Obj to the entrance pupil EPa is different from a distance from the object Obj to the entrance pupil EPb. In other words, the entrance pupils EPa and EPb are located at different coordinates in the Z-axis direction.

A distance is Zf between the entrance pupil EPa in the image capturing system CA and the in-focus plane Pf in the Z-axis direction, and a distance is Zo between the in-focus plane Pf and the object Obj in the Z-axis direction. The object Obj is located at the coordinate (−x, eo+Zf+Zo). The entrance pupil EPb in the image capturing system CB is closer to the object Obj than the entrance pupil EPa in the image capturing system CA. A distance is Δep between the entrance pupils EPa and EPb.

Assume that "f" is a focal length of each of the image capturing optical system CA and CB. Then, the coordinates "a" and "b" of the object image on the image capturing plane in the image capturing system CA and CB satisfy the expression (3).

$$b = \frac{(Z_o + Z_f)(Z_f - \Delta ep)}{(Z_o + Z_f - \Delta ep)Z_f} a + \frac{(Z_f - \Delta ep)}{(Z_f + Z_o - \Delta ep)(Z_f + eo)} Df \quad (3)$$

When arbitrary different values Zo1 and Zo2 are substituted for Zo in the expression (3), a line that connects the coordinate b1 with the coordinate b2 is an epipolar line. When the pixel located at the coordinate "a" is set to an addressed image, the addressed corresponding pixel is located on the epipolar line.

Figure 6:
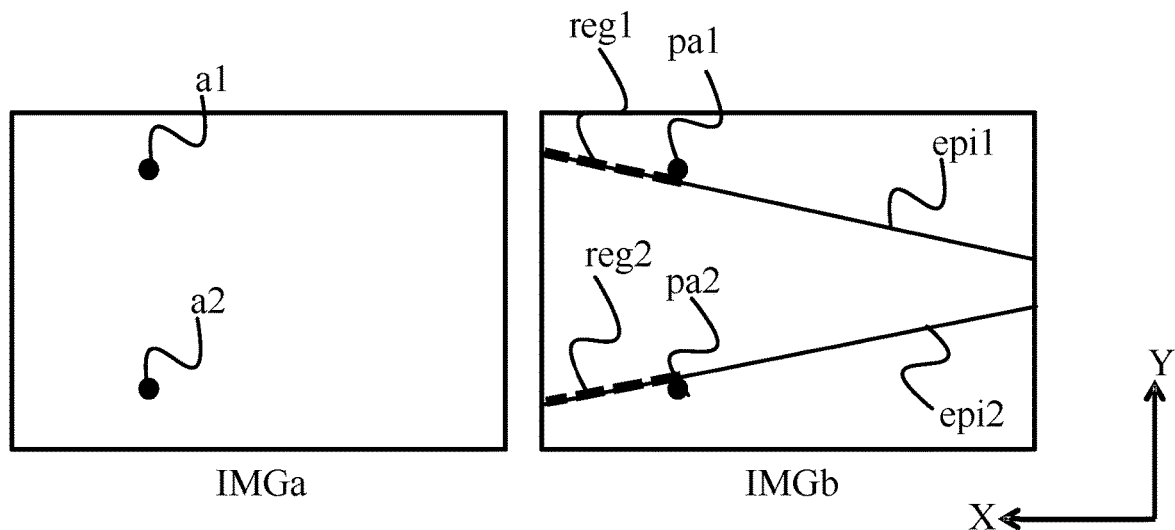
FIG. 6 illustrates epipolar lines on images obtained by the two image capturing systems illustrated in FIG. 5.

FIG. 6 illustrates the first and second images IMGa and IMGb obtained by the image capturing systems CA and CB. The coordinate system in FIG. 6 is defined similarly to that in FIG. 4. A solid line epi1 denotes an epipolar line in the second image IMGb when the pixel located at the point a1 in the first image IMGa is set to the addressed pixel, and the addressed corresponding pixel is located on the epipolar line epi1. A solid line epi2 denotes an epipolar line in the second image IMGb when the pixel located at the point a2 in the first image IMGa is set to the addressed pixel, and the addressed corresponding pixel is located on the epipolar line epi2. Points pa1 and pa2 on the epipolar lines epi1 and epi2 denote pixels located at the same coordinates in the second image IMBb as those of the addressed pixels a1 and a2 in the first image IMBa. The search areas of the addressed corresponding pixels on the epipolar lines epi1 and epi2 can be limited as illustrated by the broken lines reg1 and reg2 on the second image IMGb, when the baseline direction as the optical parameter is known in which the image capturing system CB is located relative to the image capturing system CA.

When the image capturing systems CA and CB have different entrance pupil positions as illustrated in FIG. 6, the epipolar lines epi1 and epi2 incline in the second image IMGb unlike FIG. 4 where all optical parameters are equal to each other except for the observing position. A slope of each of the epipolar lines epi1 and epi2 illustrated in FIG. 6 varies as each of a baseline length D and a shift amount Δep of the entrance pupil position changes. Thus, as described above, even when the epipolar line used to search the addressed corresponding pixel in the second image is set based on the optical parameter value different from the actual optical parameter value, the true addressed corresponding pixel cannot be found on the epipolar line since the actual epipolar line changes. In other words, a false pixel may be detected by mistake as the addressed corresponding pixel.

Thus, the optical parameter value used to calculate the epipolar line has an error for the actual and precise optical parameter in the image capturing system used to obtain each of the first and second images IMGa and IMGb, the true addressed corresponding pixel cannot be precisely detected. The precise optical parameter value cannot be obtained when all states containing the in-focus state and the thermal state of the image capturing system, are not calibrated, or when each optical parameter value scatters from the expected value due to tolerances of an optical element, a mechanical component, and a driver.

In order to detect the true addressed corresponding pixel even when the precise optical parameter value is not obtained and a correct epipolar line is unknown, it is necessary to search the entire area (all pixels) in the second image IMGb as a search area. More specifically, it is necessary for one addressed image in the first image IMGa to calculate the similarity E for all pixels in the second image IMGb, and it is necessary to calculate the similarity E N×N times when the first and second images IMGa and IMGb have N×M pixels similar to FIG. 2. Thus, when each of all pixels in the first image IMGa is set to the addressed image, it is necessary to calculate the similarity E totally (N×M)× (N×M) times in order to detect the addressed corresponding pixel on the second image IMGb for these pixels. In this case, the processing load becomes M times in comparison with the search area only for the epipolar line and the calculation amount becomes very large.

Each of the following embodiments calculates and sets a two-dimensional search area as a partial area in the second image in which the addressed corresponding area is efficiently searched, based on a maximum value and a minimum value in a range in which the optical parameter value (first and second parameter values) is variable. More specifically, as the optical parameter value changes in an assumed range (predetermined range) from a maximum value to a minimum value, the image processor sets the two-dimensional search area that contains all changing epipolar lines as narrow as possible (or at a minimum). Thereby, even when the optical parameter values in the image capturing system used to each of the first and second images are not obtained, the true addressed corresponding pixel can be precisely detected with a reduced processing load (a small calculation amount).

Figure 1A:
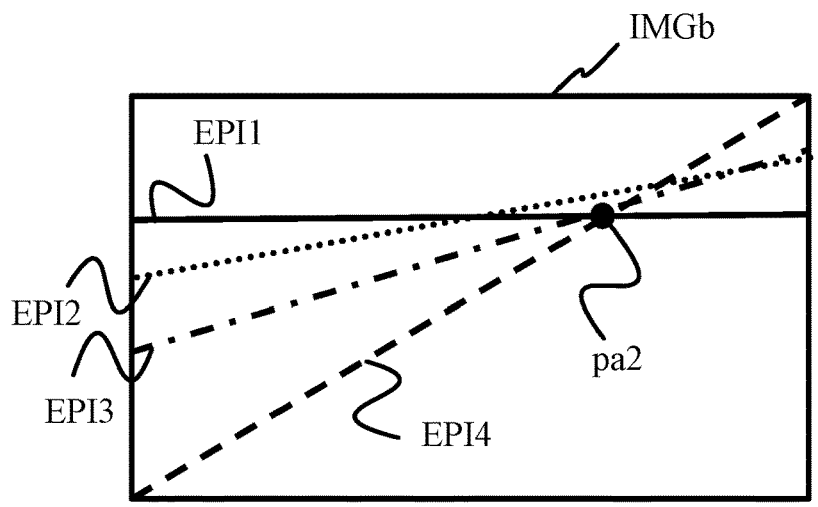
FIGS. 1A-1C are views for explaining a setting method of a two-dimensional search area according to one embodiment of the present invention.
Figure 1B:
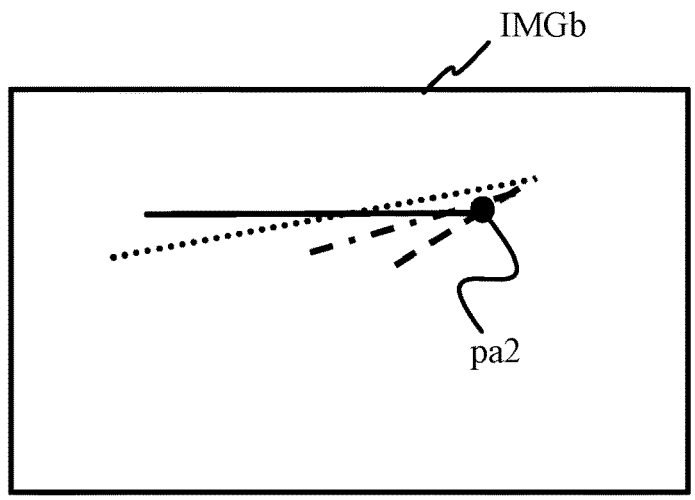
Figure 1C:
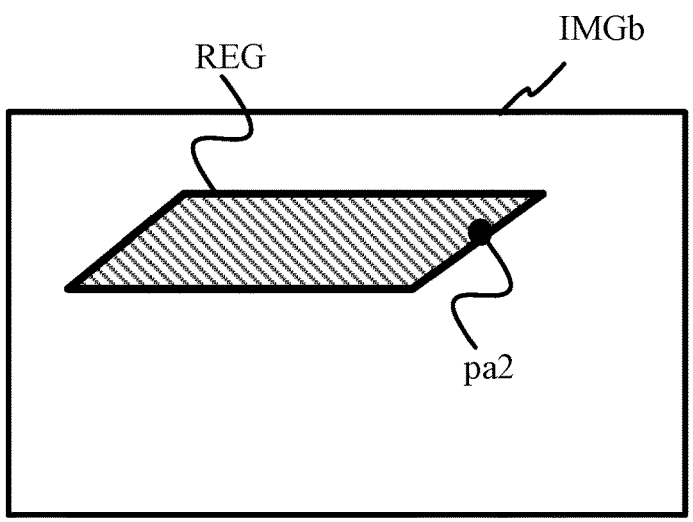

A description will be given of a setting method of a two-dimensional search area in each embodiment where the precise values of the baseline D and the distance $\Delta ep$ between entrance pupil positions are not obtained in the two image capturing systems CA and CB illustrated in FIG. 5. FIGS. 1A, 1B, and 1C enlarge lower left areas that contain the pixel pa2 in the second image IMGb illustrated in FIG. 6. EPI1, EPI2, EPI3, and EPI4 in FIG. 1A are epipolar lines in which the addressed corresponding pixels exit which correspond to the addressed pixel a2 when at least one of the baseline D and the distance $\Delta ep$ between the entrance pupil positions is different. EPI1 is the epipolar line when D=D1 and $\Delta ep$=0. EPI2 is the epipolar line when D=D1 and $\Delta ep=\Delta ep1$. EPI3 is the epipolar line when D=D2 (<D1) and $\Delta ep=\Delta ep2$ (<$\Delta ep1$). EPI4 is the epipolar line when D=0 and $\Delta ep=\Delta ep1$. Thus, FIG. 1A illustrates the changes of the epipolar lines where the baseline D changes between 0 and D1 and the distance $\Delta ep$ between the entrance pupil positions changes between 0 and $\Delta ep1$. The two-dimensional search area is set as the partial area that contains all of the epipolar lines EPI1 to EPI4 in the second image IMGb. Thereby, even when the baseline D and the distance $\Delta ep$ between the entrance pupil positions are not precisely obtained, the true addressed corresponding pixel can be precisely detected with a reduced processing load, once the baseline D falls within a range from 0 to D1 and the distance $\Delta ep$ between the entrance pupil positions falls within a range from 0 to $\Delta ep1$.

Thus, each embodiment sets the two-dimensional search area based on a change of the epipolar line as the optical parameter value changes, and can efficiently detect a precise addressed corresponding pixel even when the optical parameter value is not precisely obtained. Thereby, in comparison with a case where the entire area in the second image is set to the search area, a calculation amount necessary to search (detect) the corresponding points or the processing load can be significantly reduced.

FIG. 1B illustrates a plurality of epipolar lines in which the search area for the addressed corresponding pixel is limited where the distance to the object is known which is closest to the image capturing system among the objects contained in the image capturing angles of view (object space). In other words, where the maximum value of the difference amount of the corresponding point coordinate between the first and second images IMGa and IMGb (referred to as a "maximum corresponding point shift amount" hereinafter) is known, FIG. 1 illustrates the epipolar lines each of which limits the search area for the addressed corresponding pixel. FIG. 1C illustrates a two-dimensional search area set (calculated) so as to contain all of a plurality of epipolar lines illustrated in FIG. 1B. Even when the baseline D and the distance $\Delta ep$ between the entrance pupil positions are not precisely obtained, the true addressed corresponding pixel can be detected once the two-dimensional search area is set, the baseline D falls within a range from 0 to D1, the distance $\Delta ep$ between the entrance pupil positions falls within a range from to $\Delta ep1$. Thereby, once the maximum corresponding point shift amount is obtained, the search area used to detect a more efficient and precise addressed corresponding pixel can be set.

Herein, when the addressed pixel is different, the epipolar line is different and the above two-dimensional search area is different. Thus, a two-dimensional search area is set for each addressed pixel.

A description will now be given of an acquiring method of a maximum corresponding point shift amount. The maximum corresponding point shift amount can be obtained by performing a clustering process configured to divide one of the two images having different optical parameters into a plurality of pixel areas and by searching the addressed corresponding pixel in the other of the two images corresponding to the selected addressed pixel for each pixel area. The pixel area is an area that contains a plurality of closely arranged pixels (adjacent pixels) having similar pixel values.

Figure 7:
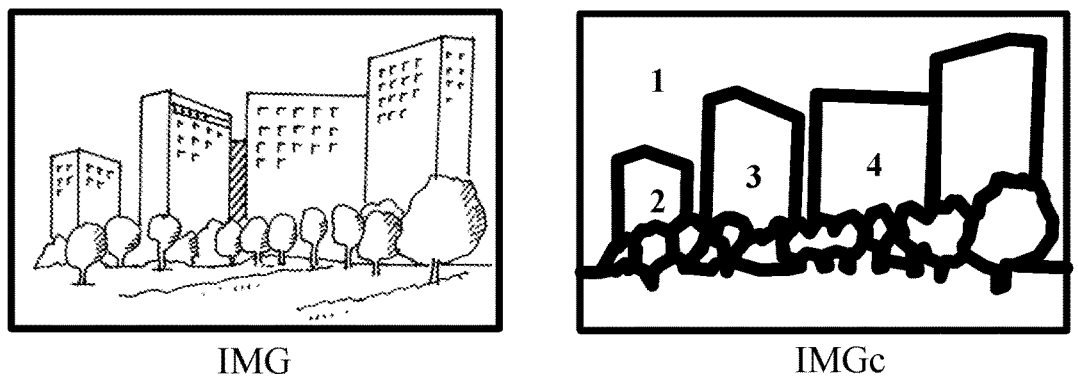
FIG. 7 is a view for explaining a clustering process.

FIG. 7 illustrates an illustrative clustering process. IMG in FIG. 7 denotes a pre-clustering image, and IMGc denotes a post-clustering image. In the post-clustering image IMGc, a thick solid line denotes a border among a plurality of pixel areas divided by the clustering process. In the image IMGc, four image areas are provided with reference numerals 1 to 4, and numbering of other image areas is omitted. The clustering process configured to divide the image into a plurality of image areas can use an arbitrary method, such as SLIC (Sample Linear Interactive Clustering) disclosed in IEEE Transactions on Pattern Analysis and Machine Intelligence VOLUME 34, Issue 11, November 2012 pp. 2274-2281, R. Achanta et al. "SLIC Superpixels Compared to State-of-the-Art Superpixel Methods."

The addressed corresponding pixel is detected in one image (search image) for the other image (base image) IMGc that includes a plurality of pixel areas divided by the clustering process, by searching the search image once for each pixel area in the base image. In other words, an addressed image is set to one arbitrary pixel in each pixel area in the base image, and the addressed corresponding pixel corresponding to the addressed pixel is searched in the search image. As a result, a number (which is the number of pixel areas in the base image) of addressed corresponding pixels are detected in the search image. A maximum corresponding point shift amount is set to a maximum value in a coordinate difference amount of each of a plurality of pairs of corresponding points obtained as a result of that the addressed corresponding pixel is searched in the search image once for each of all pixel areas in the base image.

In detecting the addressed corresponding pixels using the clustering process, a plurality of pixels in the base image are collectively treated as one pixel area, and all pixels in each pixel area are equally treated. Therefore, this detection is unsuitable for a precise detection of the addressed corresponding pixel in the search image for each of all pixels in the base image. However, the maximum corresponding point shift amount can be acquired between the base image and the search image with a small calculation amount.

The setting method of the two-dimensional search area has been described where the precise baseline length and the precise distance between the entrance pupil positions are unknown in the two image capturing systems, but even when the precise value of another optical parameter is unknown, the two-dimensional search area can be set based on a change of the epipolar line due to the change. A description will now be given of a change of an epipolar line as a value of another optical parameter changes.

A description will be given of a change of an epipolar line when the direction of the optical axis OAb in the image capturing system CB inclines by θ° to the direction of the optical axis OAa in the image capturing system CA in the two ideal image capturing systems CA and CB having different observing positions described with reference to FIG. 3. When the optical axes OAa and OAb in the two image capturing systems CA and CB are not parallel to each other, the coordinate of the same object in the second image IMGb obtained by the image capturing system CB shifts by a certain amount from the coordinate of the object in the first image IMGa obtained by the image capturing system CA. The addressed pixel "a" in the first image IMGa and the addressed corresponding pixel "b" in the second image IMGb satisfy the expression (4).

$$b = \frac{d - f\tan\theta}{1 + \frac{d}{f}\tan\theta}, d = a + \frac{(Z_f)}{(Z_f + Z_o)(Z_f + eo)} Df \quad (4)$$

The expression (4) is to be satisfied by "a" and "b" in the two-dimensional space, but can be extended to the three-dimensional space. In this case, an angle between the optical axes OAa and OAb in the image capturing systems CA and CB in the X-Z space or Y-Z space may be substituted.

Figure 8:
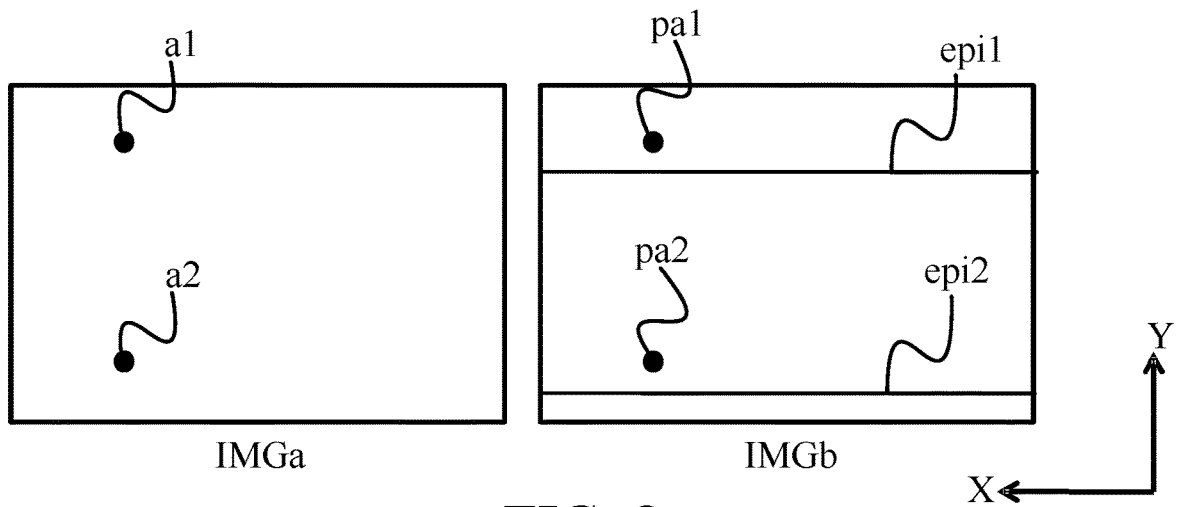
FIG. 8 illustrates epipolar lines when optical axes in the two image capturing systems form an angle.

FIG. 8 illustrates the first and second images IMGa and IMGb obtained by the image capturing systems CA and CB. The coordinate system in FIG. 8 is defined similarly to that in FIG. 4. In FIG. 8, a solid line epi1 represents an epipolar line in the second image IMGb when the pixel located at the point a1 in the first image IMGa is set to the addressed pixel, and the addressed corresponding pixel is located on the epipolar line epi1. A solid line epi2 represents an epipolar line in the second image IMGb when the pixel located at the point a2 in the first image IMGa is set to the addressed pixel, and the addressed corresponding pixel is located on the epipolar line epi2.

A description will be given of a change of an epipolar line where the two ideal image capturing systems CA and CB having different observing positions described with reference to FIG. 3 have different focal lengths. Where the two image capturing systems CA and CB have different focal lengths, the coordinate of the same object in the second image IMGb obtained by the image capturing system CB is multiplied by a predetermined number from the image center in the radial direction for the object coordinate in the first image IMGa obtained by the image capturing system CA. Where fa is a focal length of the image capturing system CA and fb is a focal length of the image capturing system CB, the addressed pixel "a" in the first image IMGa and the addressed corresponding pixel "b" in the second image IMGb satisfy the expression (5).

$$b = a\frac{f_b}{f_a} + \frac{(Z_f)}{(Z_f + Z_o)(Z_f + eo)} Df_b \quad (5)$$

Figure 9:
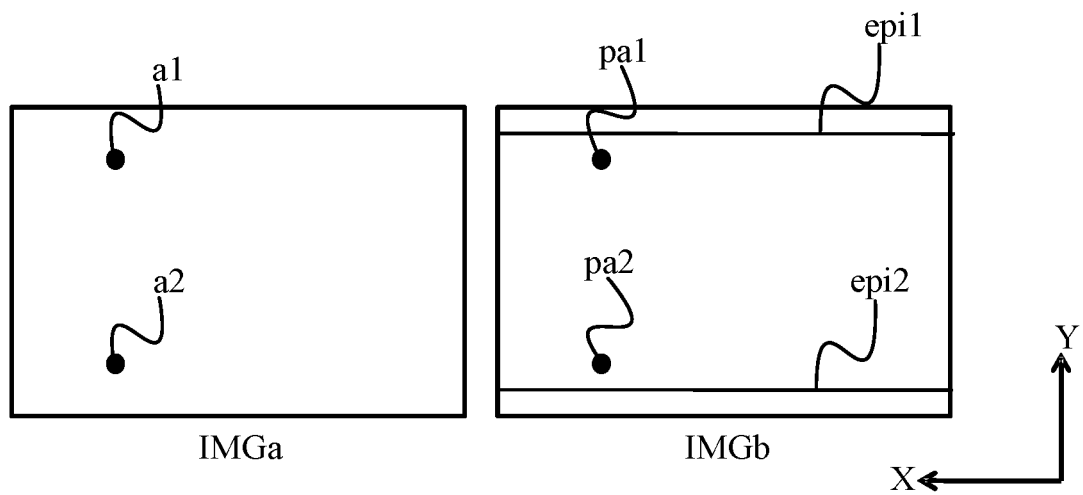
FIG. 9 illustrates epipolar lines when the two image capturing systems have different focal lengths.

FIG. 9 illustrates the first and second images IMGa and IMGb obtained by the image capturing systems CA and CB. The coordinate system in FIG. 9 is defined similarly to that in FIG. 4. The focal length fb is longer than the focal length fa. A solid line epi1 represents an epipolar line in the second image IMGb where the pixel located at the point a1 in the first image IMGa is set to the addressed pixel, and the addressed corresponding pixel is located on the epipolar line epi1. A solid line epi2 represents an epipolar line in the second image IMGb when the pixel located at the point a2 in the first image IMGa is set to the addressed pixel, and the addressed corresponding pixel is located on the epipolar line epi2.

The epipolar line is affected by differences of the direction of the optical axis (angle between the optical axes) and the focal length in the two image capturing systems, as described above. Even where the precise values of the two types of optical parameters are not obtained, the addressed corresponding pixel can be precisely detected by setting (calculating) the two-dimensional search area that contains all the epipolar lines that changes as the above optical parameter values change. This can be similarly applied to a case where values of another optical parameter are different between the two image capturing systems, such as a front principal position, a position in the Z-axis direction (optical axis direction) of the image sensor in the image capturing system, a positional difference between the center of the image sensor and the optical axis in the optical system, a tilt of the image sensor to the optical axis, and a rotating amount of the image sensor around the optical axis.

In order to save a calculation amount and a data amount, the optical parameter to be considered may be limited. In that case, the two-dimensional search area may be set so as to reflect the variable optical parameter expected in the image capturing system that obtains an image. For example, a focal length and an entrance pupil position are generally likely to change due to focus driving in an image capturing system having a single focus optical system, and thus the two-dimensional search area may be set based on these factors. In an image capturing system that includes a zoom lens in which a plurality of optical elements are driven during the magnification variations, a two-dimensional search area may be set based on a change of an optical axis in addition to an optical parameter to be considered for the image capturing system that includes the single focus optical system. In the compound eye image capturing apparatus that includes a plurality of optical systems having different focal lengths, a baseline length (that is a distance between the optical systems) may be considered in addition to the above optical parameters.

While the above discussion uses the two image capturing systems, this discussion is applicable to three or more image capturing systems and a case where a plurality of images are captured by changing a position of one image capturing system and the optical parameter value.

A description will now be given of specific embodiments.

First Embodiment

Figure 10:
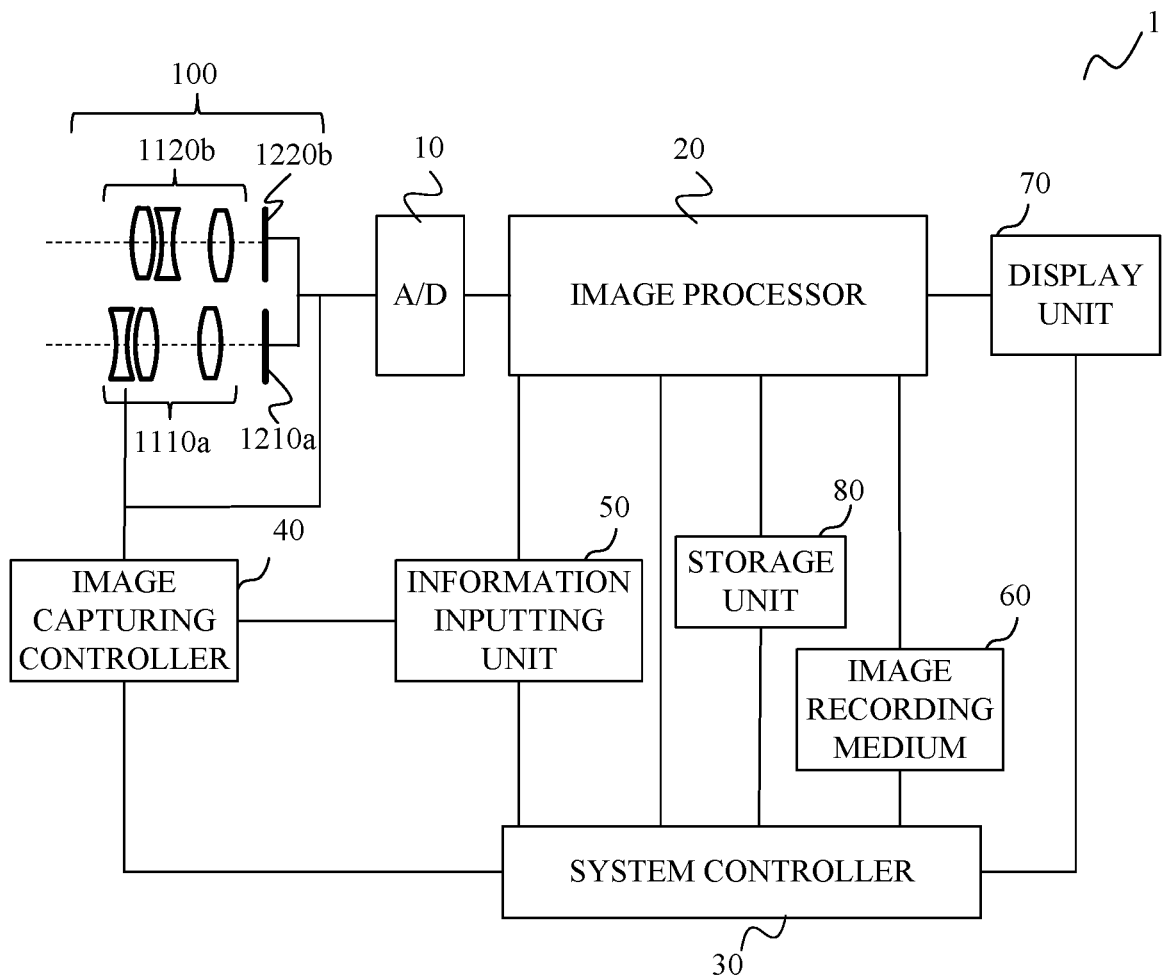
FIG. 10 is a block diagram illustrating a configuration of a compound eye image capturing apparatus according to first and second embodiments of the present invention.
Figure 11A:
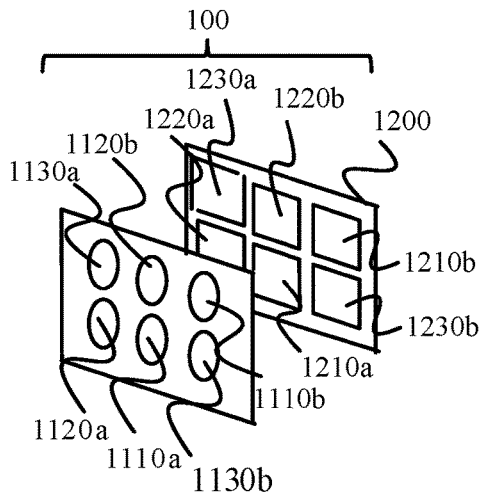
FIG. 11A is a perspective view of an image capturing unit in the compound eye image capturing apparatus according to first and second embodiments of the present invention.
Figure 11B:
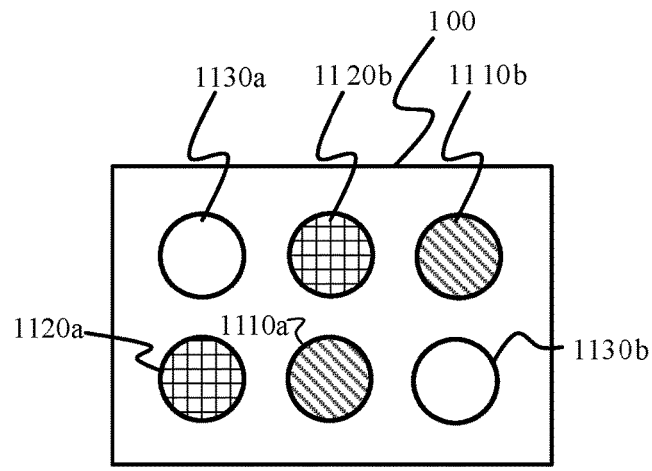
FIG. 11B is a front view of an image capturing unit in the compound eye image capturing apparatus according to first and second embodiments of the present invention.

FIG. 10 illustrates a configuration of a compound eye image capturing apparatus 1 according to a first embodiment of the present invention. FIGS. 11A and 11B illustrate a configuration of an image capturing unit 100 in the compound eye image capturing apparatus 1.

The compound eye image capturing apparatus 1 includes the image capturing unit 100, an A/D converter 10, an image processor 20, a system controller 30, an image capturing controller 40, an information input unit 50, an image recording medium 60, a display unit 70, and a storage unit 80. The compound eye image capturing apparatus 1 is an image capturing apparatus integrated with the following image capturing optical system in the image capturing unit 100, but the image capturing optical system may be attached to and detached from the image capturing apparatus that includes an image sensor.

As illustrated in FIGS. 11A and 11B, the image capturing unit 100 includes six image capturing optical system (ommatidia) 1110a, 1110b, 1120a, 1120b, 1130a, and 1130b each configured to form an optical image of an object (object image). The image capturing unit 100 includes six image sensors 1210a, 1210b, 1220a, 1220b, 1230a, and 1230b for the six image capturing optical systems 1110a, 1110b, 1120a, 1120b, 1130a, and 1130b. Each of the six image capturing optical systems 1110a, 1110b, 1120a, 1120b, 1130a, and 1130b is a single focus optical system that includes at least one lens and a focus lens. One image capturing optical system and one image sensor corresponding to the image capturing system constitute one image capturing system. The image capturing unit 100 includes six image capturing systems. FIG. 10 illustrates sections of the image capturing systems that contain the optical axes in the image capturing optical systems 1110a and 1120b in the image capturing unit 100.

The six image sensors 1210a, 1210b, 1220a, 1220b, 1230a, and 1230b are configured integrally and held on the same plane as an image sensor unit 1200. Of course, these six image sensors 1210a, 1210b, 1220a, 1220b, 1230a, and 1230b may not be located on the same plane. The six image capturing optical systems 1110a, 1110b, 1120a, 1120b, 1130a, and 1130b are arranged so that they have optical axes parallel to one another.

The image capturing optical systems 1110a and 1110b are a pair of wide-angle ommatidia with focal lengths equal to each other and shortest (or with wide angles of view) among those of the six image capturing optical systems 1110a to 1130b. The image capturing optical systems 1120a and 1120b are a pair of middle ommatidia with focal lengths equal to each other and intermediate (or with middle angles of view) among those of the six image capturing optical systems 1110a to 1130b. The image capturing optical systems 1130a and 1130b are a pair of telephoto ommatidia with focal lengths equal to each other and longest (or with telephoto angles of view) among those of the six image capturing optical systems 1110a to 1130b. The image capturing optical system 1110a is a base viewpoint (observing position) in generating the following combined image.

Each of the image sensors 1210a, 1210b, 1220a, 1220b, 1230a, and 1230b convert an object image formed on the image capturing plane by a corresponding one of the image capturing optical systems 1110a, 1110b, 1120a, 1120b, 1130a, and 1130b into an analog electric signal. The A/D converter 10 converts the analog signal output from the image sensors 1210a, 1210b, 1220a, 1220b, 1230a, and 1230b into a digital signal, and outputs image data as six digital signals to the image processor 20.

The image processor 20 performs image processing, such as a pixel interpolation process and a color conversion process, for the six pieces of image data input from the A/D converter 10, and generates six viewpoint images. The six viewpoint images from the image processor 20 are sent to the system controller 30. The image processor 20 performs a corresponding point detection process among the six viewpoint images based on the optical parameter value of the image capturing unit 100 read out of the storage unit 80, and calculates a coordinate difference amount of the corresponding points among the six viewpoint images. The image processor 20 generates the combined image based on the difference amount, and calculates an object distance of each object in the object space in the viewpoint image. The image processor 20 corresponds to an image processing apparatus mounted on the compound eye image capturing apparatus 1, and serves as an area setter and an image combiner.

The information input unit 50 obtains input information selected and input as a desired image capturing condition by the user, and supplies information of the image capturing condition to the system controller 30. The system controller 30 captures an image of an image (object space) by controlling a moving amount of a focus lens, an F-number, and an exposure time period in each image capturing optical system through the image capturing controller 40 based on the input information of the image capturing condition. Thereby, the image processor 20 generates the above six viewpoint images.

The image recording medium 60 stores the six viewpoint images obtained through image capturing, the combined image generated from the viewpoint images, a map of the object distance generated from the viewpoint images, and a file header for an image file. The display unit 70 includes a liquid crystal display element, etc., and displays a live-view image before the image is captured, the six viewpoint images after the images are captured, a combined image, an object distance map, and a state of the image capturing apparatus 1, etc.

Figure 12:
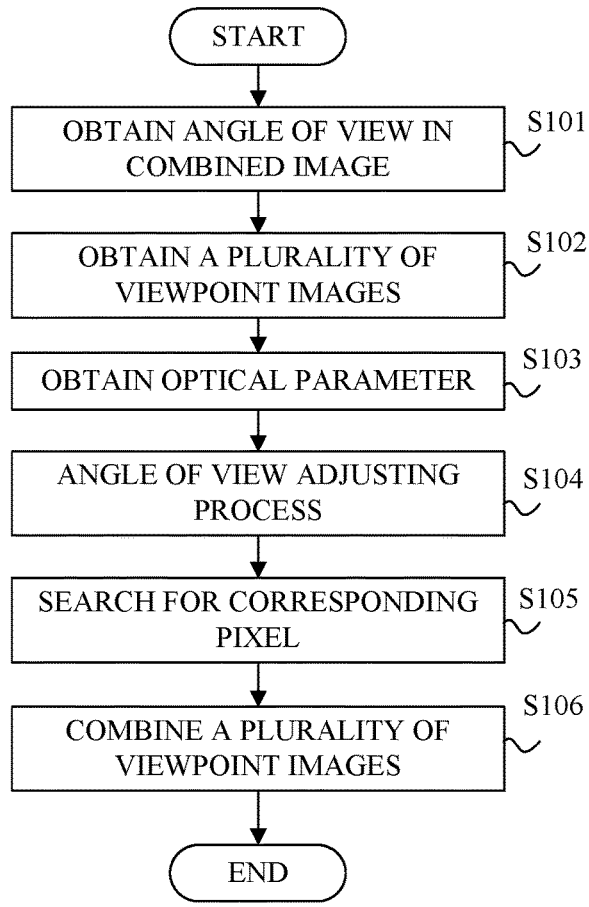
FIG. 12 is an image processing flowchart performed in the compound eye image capturing apparatus 1 according to first embodiment.

Referring now to a flowchart in FIG. 12, a description will be given of image processing performed by the image processor 20. The image processor 20 as a computer executes this image processing in accordance with an image processing program as a computer program.

In the step S101, the image processor 20 calculates a focal length fo corresponding to an output combined image, which will be output later, in accordance with the information of the angle of view input by the user through the information input unit 50 and received via the system controller 30. Where the user does not input the angle of view, the image processor 20 may set an arbitrary preset focal length to the focal length fo corresponding to the combined image. An angle of view range that can be input by the user is a range in which the focal length fo is equal to or longer than the focal length of the wide-angle ommatidium and equal to or shorter than the focal length of telephoto ommatidium.

In the step S102, when the system controller 30 controls the image capturing unit 100 and captures an image in the object space, the image processor 20 generates the six viewpoint images by performing the above image processing for the image data from the A/D converter 10. In the following description, a viewpoint image obtained by image capturing through the image capturing optical system 1110a among the six viewpoint images will be referred to as a base viewpoint image hereinafter.

In the step S103, the image processor 20 reads out of the storage unit 80, values of a plurality of optical parameters in the six image capturing systems in the image capturing unit 100. The plurality of optical parameters contain a focal length in each image capturing optical system, a front principal point position in each image capturing optical system, an entrance pupil position in each image capturing optical system, and a baseline length between the image capturing systems. A maximum value and a minimum value in a range in which each optical parameter can change are those in which each optical parameter change as the focus lens is driven. A value of each optical parameter in the image capturing system that includes the image capturing optical system 1110a corresponds to the first parameter value, and a value of each optical parameter of the five image capturing systems that include the image capturing optical systems 1110b to 1130b corresponds to the second parameter value.

In the step S104, the image processor 20 performs a trimming enlargement process or reduction process for each viewpoint image, and equalizes the angle of view of each viewpoint image to that of the combined image. More specifically, when the focal length fo is shorter than the focal length of the middle ommatidium, the image processor 20 performs the reduction process for the four viewpoint images captured through the middle and telephoto ommatidia, and the trimming enlargement process for the two viewpoint images captured through the wide ommatidia. When the focal length fo is longer than the focal length of the middle ommatidium, the image processor 20 performs the reduction process for the two viewpoint images captured through the telephoto ommatidia, and performs the trimming enlargement process for the four viewpoint images captured through the telephoto and middle ommatidia. A known pixel interpolation process, such as the bi-cubic interpolation, is used for the trimming enlargement process and reduction process.

In the step S105, the image processor 20 performs a corresponding point detection process for one base viewpoint image and the other five viewpoint images (referred to as "search viewpoint images" hereinafter) in the plurality of viewpoint images having equal angles of view. More specifically, the image processor 20 calculates the two-dimensional search area used to search the addressed corresponding pixel in each search viewpoint image for each of the plurality of pixels in the base viewpoint image. The two-dimensional search area contains all epipolar lines corresponding to all combinations of the maximum value and the minimum value in the range in which the values of the plurality of optical parameters can vary, in each search viewpoint image.

The image processor 20 calculates the two-dimensional search area used to search the addressed corresponding pixel in the search viewpoint image where the pixel located at the center of each pixel area in the base viewpoint image is set to the addressed pixel, and searches the same two-dimensional search area in searching for the addressed corresponding pixel where the pixel in the same pixel area is set to the addressed pixel. When the two-dimensional search area is large, a calculation amount necessary to calculate the two-dimensional search area becomes smaller but the addressed corresponding pixel may not exist in the two-dimensional search range when the two-dimensional search area is excessively large. Herein, assume that the two-dimensional search area has, for example, 10×10 pixels.

Thus, the image processor 20 searches the two-dimensional search area in the plurality of search viewpoint images for a corresponding pixel (addressed corresponding pixel) for each pixel (addressed pixel) in the base viewpoint image. When the pixels corresponding to the plurality of (or part of) search viewpoint images are detected for all pixels in the base viewpoint image, the flow moves to the next step.

In the step S106, the image processor 20 generates one combined image based on the coordinate difference amounts of the corresponding points between the base viewpoint image and each search viewpoint image. More specifically, the image processor 20 calculates an average value of a pixel value of the addressed pixel in the base viewpoint image and a pixel value of the addressed corresponding pixel in the five search viewpoint images corresponding to the addressed pixel, and sets the result to a pixel value of a pixel corresponding to the addressed pixel and the addressed corresponding pixel in the combined image. The image processor 20 performs this process for all pixels in the base viewpoint image, calculates the pixel values of all pixels in the combined image, and generates the combined image.

Thus, this embodiment searches the two-dimensional search area set in the search viewpoint image for the addressed corresponding pixel based on the range in which the optical parameter value used to capture a plurality of viewpoint images is variable in the image capturing system. Thereby, even where the optical parameter value is not precisely obtained for each image capturing system, the addressed corresponding pixel can be precisely detected with a smaller calculation amount. As a result, a good combined image can be generated.

Second Embodiment

A description will be given of a second embodiment of the present invention. This embodiment is a variation of the first embodiment with the compound eye image capturing apparatus 1. A configuration of the compound eye image capturing apparatus 2 according to this embodiment is similar to that of the compound eye image capturing apparatus 1 according to the first embodiment. The compound eye image capturing apparatus 2 sets the image capturing optical system 1110a to the wide-angle base viewpoint, the image capturing optical system 1120b to the middle base viewpoint, and the image capturing optical system 1130a to the telephoto base viewpoint.

The storage unit 80 in the compound eye image capturing apparatus 2 stores table data (referred to as a "search area table" hereinafter) that represents the two-dimensional search area for each image capturing condition in the search viewpoint images captured through the image capturing optical systems 1110b, 1120b, and 1130b. One search area table is prepared for each of two (a pair of) wide-angle ommatidia, two (a pair of) middle ommatidia, and two (a pair of) telephoto ommatidia. Each search area table is data indicative of the two-dimensional search area for each of a focal length and a coordinate of the addressed pixel in one image capturing optical system and the other image capturing optical system as the base viewpoint among each pair of ommatidia.

The two-dimensional search area in each search area table has been calculated based on values of the plurality of optical parameters in the image capturing optical systems 1110a to 1130b. More specifically, the plurality of optical parameters contain an in-focus distance, a focal length, an entrance pupil position, a front principal point position, and a baseline length in each of the image capturing optical systems 1110a to 1130b. The two-dimensional search area is calculated by setting a maximum value of a range in which values of the plurality of optical parameters are variable to a value of 105% of a reference value of each optical parameter, and a minimum value of a range in which values of the plurality of optical parameters are variable to a value of 95% of the reference value. Even in this embodiment, the two-dimensional search area is a partial area that contains all epipolar lines corresponding to all combinations of the maximum and minimum values in the range in which values of the plurality of optical parameters are variable. This embodiment exemplarily sets the +5% value and −5% value of the reference value of each optical parameter to the maximum value and the minimum value in a range in which the values of the plurality of optical parameters used to set the two-dimensional search area are variable. Alternatively, this embodiment may calculate, based on the tolerances of the optical element, the mechanical unit, and the driver in each image capturing optical system, the maximum value and the minimum value in a range in which the values of the plurality of optical parameters used to set the two-dimensional search area are variable, or may previously measure the maximum value and the minimum value.

In this embodiment, the first parameter value corresponds to each optical parameter value in the three image capturing systems that include the image capturing optical systems 1110a, 1120a, and 1130a. The second parameter value corresponds to each optical parameter value in the three image capturing systems that include the other image capturing optical systems 1110b, 1120b, and 1130b.

The storage unit 80 stores the optical parameter value necessary to calculate the object distance. The optical parameter, as used herein, contains a focal length in each image capturing optical system, an entrance pupil position in each image capturing optical system, a distance between a front principal point positions, and a baseline length between the image capturing system as a base viewpoint and the other image capturing system. A difference amount of the entrance pupil position can be calculated based on the entrance pupil position in each image capturing optical system. The image processor 20 in the compound eye image capturing apparatus 2 performs a corresponding point detection process in the two-dimensional search area in the search viewpoint image, and generates (calculates) a distance map as information of the depth (object distance) in the object space in each viewpoint image based on the result and the optical parameters. The image processor 20 corresponds to an image processing apparatus mounted on the compound eye image capturing apparatus 2, and serves as an area setter and a depth information generator.

Figure 13:
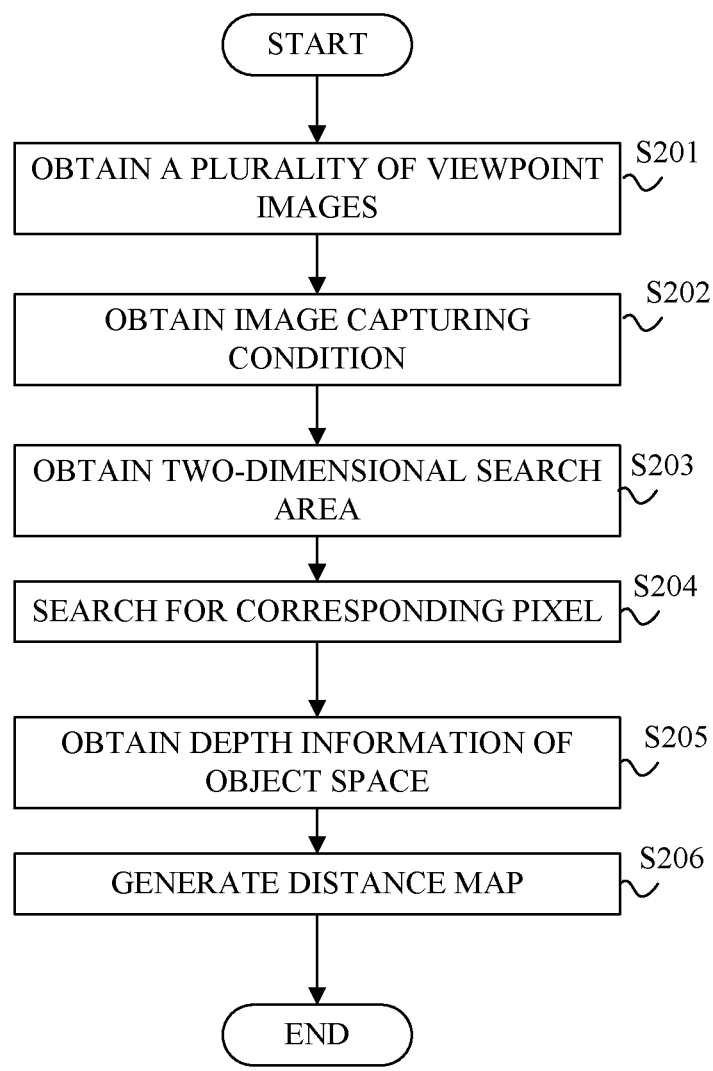
FIG. 13 is an image processing flowchart performed in the compound eye image capturing apparatus 2 according to second embodiment.

Referring now to a flowchart in FIG. 13, a description will be given of image processing performed by the image processor 20. The image processor 20 as a computer executes this image processing in accordance with an image processing program as a computer program.

In the step S201, when the system controller 30 controls the image capturing unit 100 and captures an image in the object space, the image processor 20 generates the six viewpoint images by performing the image processing described in the first embodiment for the image data from the A/D converter 10. In the six viewpoint images, images captured through the ommatidia 1110a, 1120a, and 1130a as the wide-angle base viewpoint, middle base viewpoint, and the telephoto base viewpoint will be referred to as a wide-angle base viewpoint image, a middle base viewpoint image, and a telephoto base viewpoint image. In the six viewpoint images, images captured through the ommatidia 1110b, 1120b, and 1130b paired with the ommatidia 1110a, 1120a, and 1130a will be referred to as a wide-angle search viewpoint image, a middle search viewpoint image, and a telephoto search viewpoint image. The image processor generates the six viewpoint images and stores the focal length of each ommatidium as the image capturing condition.

In the step S202, the image processor 20 obtains a focal length in each ommatidium stored in the step S201.

In the step S203, the image processor 20 reads the two-dimensional search area corresponding to each focal length out of the search area table for each of the wide-angle, middle, and telephoto ommatidia stored in the storage unit 80.

In the step S204, the image processor 20 searches the two-dimensional search area read out in the step S203 in the wide-angle, middle, and telephoto search viewpoint images for the addressed corresponding pixels corresponding to the addressed pixels in the wide-angle, middle, and telephoto base viewpoint images.

Thus, the image processor 20 searches the pixel (addressed corresponding pixel) in the two-dimensional search area in the plurality of search viewpoint images corresponding to each pixel (addressed pixel) in the base viewpoint image. When the pixels in the plurality of (or part of) search viewpoint images are detected for all pixels in the base viewpoint image, the flow moves to the next step.

In the step S205, the image processor 20 reads values of the plurality of optical parameters necessary to calculate the object distance out of the storage unit 80, and calculates a plurality of object distances in the object space using the values of the plurality of optical parameters and the plurality of corresponding point coordinates. The object distance is $Z_o$ calculated by substituting the coordinates of each addressed pixel and each addressed corresponding pixel, the focal length and values of the plurality of optical parameters in each ommatidium for the expression (3).

In the step S206, the image processor 20 generates a distance map representing the plurality of object distances calculated in the step S205. In this embodiment, the image processor 20 generates the distance map for the wide angle of view based on the coordinates of the addressed and addressed corresponding pixels in the wide-angle base and search viewpoint images, and generates the distance map for the middle angle of view based on the coordinates of the addressed and addressed corresponding pixels in the middle base and search viewpoint images. The image processor 20 generates the distance map for the telephoto angle of view based on the coordinates of the addressed and addressed corresponding pixels in the telephoto base and search viewpoint images. The depth information in the object space can be obtained based on the distance map for the wide angle of view which is deeper than the depth information in the object space obtained based on the distance maps for the middle and telephoto angles of view. The depth information can be obtained based on the distance map for the telephoto angle of view which is narrower but finer than the depth information obtained based on the distance maps for the middle and wide angles of view.

This embodiment also searches the two-dimensional search area set in the search viewpoint image for the addressed corresponding pixel based on the range in which the optical parameter value used to capture a plurality of viewpoint images is variable in the image capturing system. Thereby, even when the optical parameter value is not precisely obtained for each image capturing system, the addressed corresponding pixel can be precisely detected with a smaller calculation amount. As a result, a good combined image can be generated.

Third Embodiment

A description will now be given of a stereo image capturing apparatus according to a third embodiment of the present invention. The stereo image capturing apparatus according to this embodiment can obtain a distance map with a high processing speed.

Figure 14:
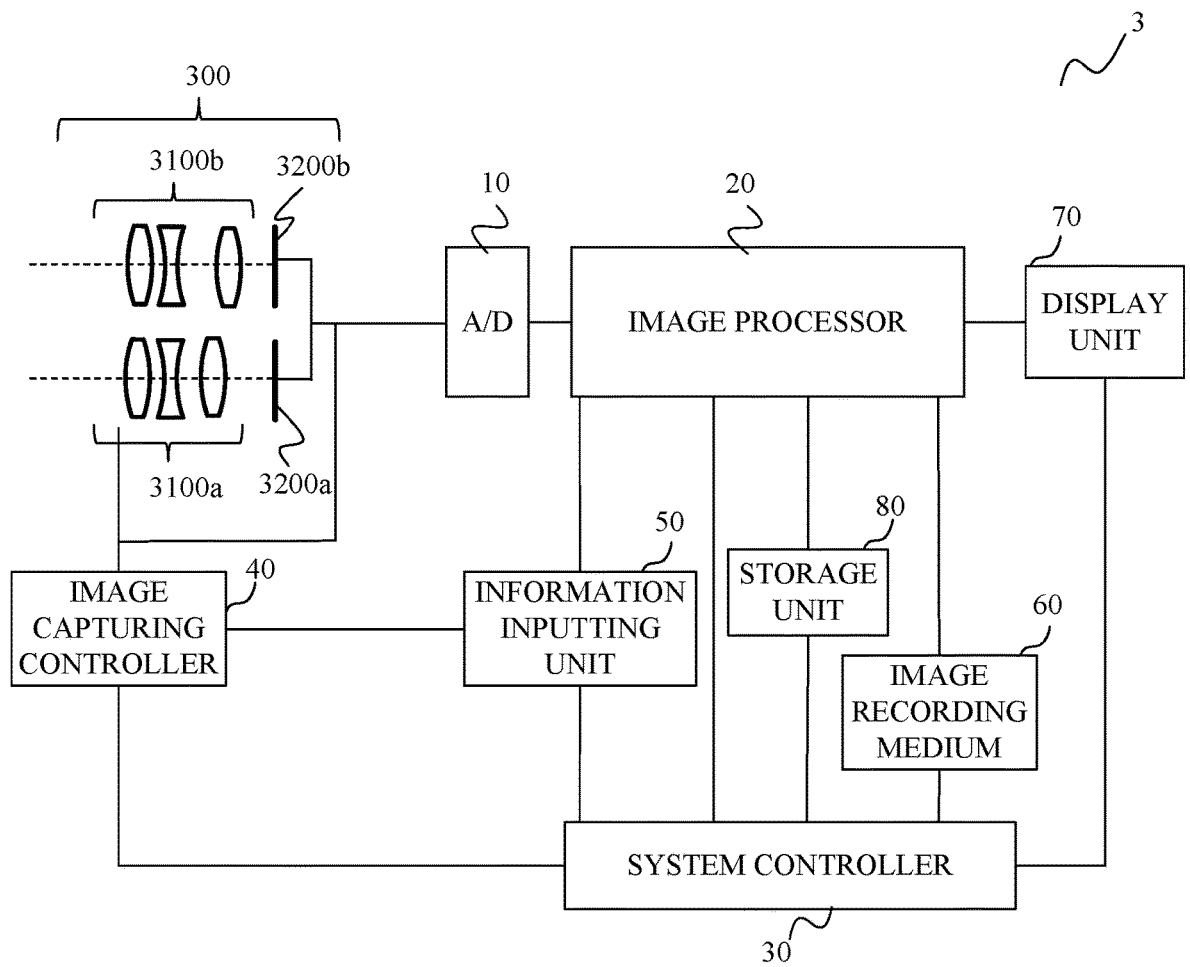
FIG. 14 is a block diagram illustrating a configuration of a stereo image capturing apparatus according to a third embodiment of the present invention.

FIG. 14 illustrates a configuration of a stereo image capturing apparatus 3 according to this embodiment. A configuration of the stereo image capturing apparatus 3 is similar to that of the compound eye image capturing apparatus 1 according to the first embodiment except for the image capturing unit 300, and those elements in this embodiment, which are common or corresponding elements in the first embodiment, will be designated by the same reference numerals.

The stereo image capturing apparatus 3 includes the image capturing unit 300. The image capturing unit 300 includes image capturing optical systems 3100a and 3100b, and image sensors 3200a and 3200b corresponding to the image capturing optical systems 3100a and 3100b. One image capturing optical system and one corresponding image sensor constitute one image capturing system. In other words, the image capturing unit 300 includes two image capturing systems. Each of the image capturing optical systems 3100a and 3100b includes at least one lens, and has the same focal length. The image capturing optical system 3100a is a base viewpoint in generating the distance map. An image captured through the image capturing optical system 3100a will be referred to as a base viewpoint image, and an image captured through the image capturing optical system 3100b will be referred to as a search viewpoint image.

The storage unit 80 in the stereo image capturing apparatus 3 stores a search area table indicative of the two-dimensional search area in the search viewpoint image for each pixel (coordinate) in the base viewpoint image. The two-dimensional search area in the search area table is calculated based on the values of the plurality of optical parameters in the image capturing optical systems 3110a and 3100b. More specifically, the plurality of optical parameters include a focal length, an entrance pupil position, a front principal point position, and a baseline length in each of the image capturing optical systems 3100a and 3100b. In addition, the plurality of optical parameters include a center shift amount as a positional difference between the center of each of the image sensors 3200a and 3200b and the optical axis of each of the image capturing optical systems 3200a and 3200b, a rotating angle of each of the image sensors 3200a and 3200b around the optical axis, and a tilt angle of the image sensors 3200a and 3200b relative to the plane orthogonal to the optical axis. The two-dimensional search area is a partial area that contains all epipolar lines corresponding to all combinations of the maximum and minimum values in the range in which the values of the plurality of optical parameters are variable.

A maximum value and a minimum value in a range in which each of the center shift amount, the rotating angle, and the tilt angle in each image sensor is variable may be calculated based on the assembly tolerance of the image capturing unit 300. The ideally arranged image sensors have a center shift amount of 0, a rotating angle of 0, and a tilt angle of 0. For example, a maximum value is +1 mm in a range in which the center shift amount is variable, and a minimum value is −1 mm in the range in which the center shift amount is variable. A maximum value is +1° in a range in which each of the rotating angle and the tilt angle is variable, and a minimum value is −1° in the range in which each of the rotating angle and the tilt angle is variable.

In this embodiment, each optical parameter in the image capturing system that contains the image capturing optical system 3100a corresponds to the first parameter value, and each optical parameter value in the five image capturing systems that contain the image capturing optical system 3100b corresponds to the second parameter value. The image processor 20 corresponds to an image processing apparatus mounted on the stereo image capturing apparatus 3, and serves as an area setter and a depth information generator.

Figure 15:
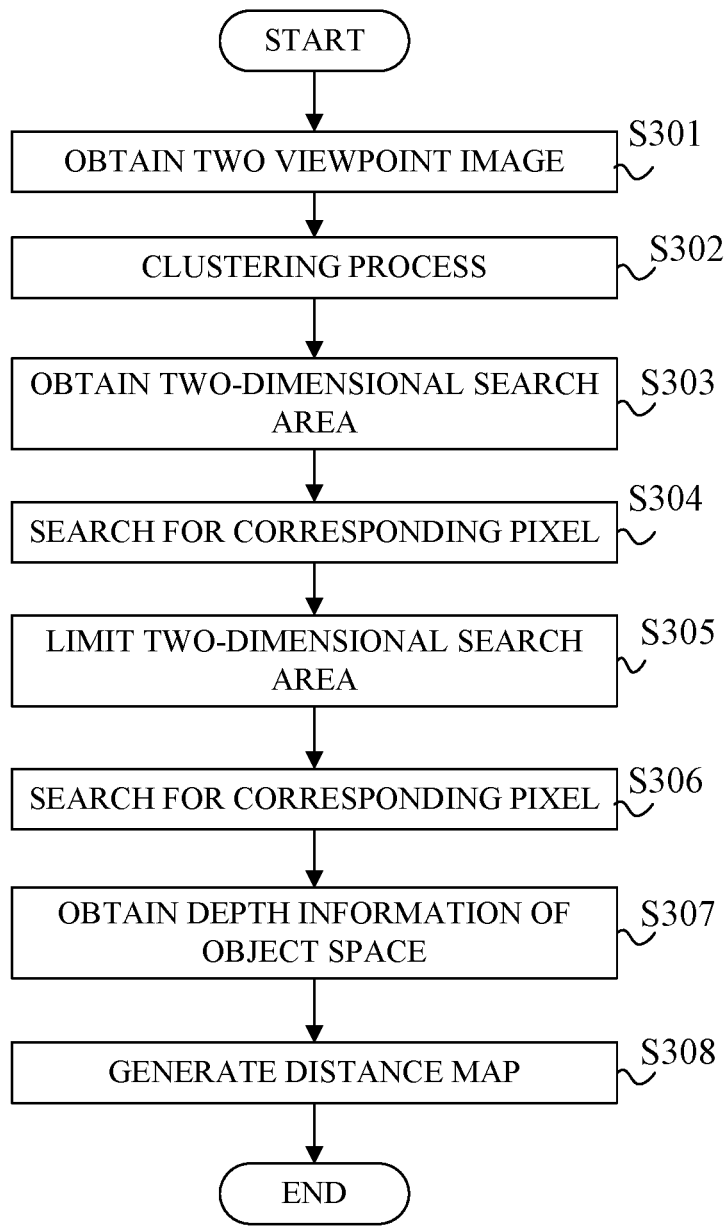
FIG. 15 is an image processing flowchart performed in the stereo image capturing apparatus according to the third embodiment.

Referring now to a flowchart in FIG. 15, a description will be given of image processing performed by the image processor 20. The image processor 20 as a computer executes this image processing in accordance with an image processing program as a computer program.

In the step S301, when the system controller 30 controls the image capturing unit 300 and captures an image in the object space, the image processor 20 generates the base viewpoint image and the search viewpoint image by performing the image processing described in the first embodiment for the image data from the A/D converter 10.

In the step S302, the image processor 20 performs the clustering process for the base viewpoint image using the SLIC method, and divides the base viewpoint image into a plurality of pixel areas. The pixel area may be divided into an arbitrary number of pixel areas, although it is 30 pixel areas in this embodiment.

In the step S303, the image processor 20 reads the two-dimensional search area out of the search area table in the storage unit 80 for each pixel (coordinate) in the base viewpoint image.

In the step S304, the image processor 20 searches the two-dimensional search area read in the step S303 in the search viewpoint image, for the addressed corresponding pixel in the search viewpoint image corresponding to one addressed image in each pixel area in the base viewpoint image. The image processor 20 obtains the maximum value as a maximum corresponding point shift amount in the coordinate difference amount between the base image and the search image of the plurality of pairs of corresponding points that include the addressed corresponding pixel and the addressed pixel in the pixel area.

In the step S305, the image processor 20 adjusts the two-dimensional search area for coordinates read in the step S303 so as to delete a pixel apart from the coordinate of the addressed image by a distance longer than the maximum corresponding point shift amount, and sets the limited two-dimensional search area.

In the step S306, the image processor 20 searches the two-dimensional search area limited in the step S305 in the search viewpoint image for the addressed corresponding pixel corresponding to the addressed pixel.

Thus, the image processor 20 searches the two-dimensional search area in the search viewpoint image for a corresponding pixel (addressed corresponding pixel) for each pixel (addressed pixel) in the base viewpoint image. When the pixels in the search viewpoint image corresponding to all (or part of) pixels in the base viewpoint image are detected, the flow moves to the next step.

In the step S307, the image processor 20 calculates a plurality of object distances in the object space using coordinates of a plurality of corresponding points.

In the step S308, the image processor generates a distance map indicative of the plurality of object distances calculated in the step S307.

This embodiment also searches the two-dimensional search area set in the search viewpoint image for the addressed corresponding pixel based on the range in which the optical parameter value used to capture a plurality of viewpoint images is variable in the image capturing system. Thereby, even when the optical parameter value is not precisely obtained for each image capturing system, the addressed corresponding pixel can be precisely detected with a smaller calculation amount. As a result, a good combined image can be generated. In particular, this embodiment sets the limited two-dimensional search area according to the maximum corresponding point shift amount between the base viewpoint image that has received the clustering process (and thus includes a plurality of pixel areas) and the search viewpoint image. Thereby, this embodiment can precisely detect the addressed corresponding pixel with a small calculation amount, and precisely generate a distance map at a high speed.

Fourth Embodiment

A description will now be given of an image capturing apparatus according to a fourth embodiment of the present invention. The image capturing apparatus according to this embodiment obtains a plurality of images having different in-focus distances, and generates a deep focus image (pan-focus image) using the plurality of images.

A deep focus image in which the entire object space is focused can be generated by selecting and combining a high-sharpness partial range based on a plurality of images having different in-focus distances obtained by capturing the same object space. A plurality of images having different in-focus distances can be obtained by sequentially driving the focus lens in the single image capturing system and by capturing images a plurality of times or by performing the focus blacket photography. However, when the optical parameter value changes, such as the focal length and the entrance pupil position in the image capturing optical system, as the focus lens moves, the pixels (coordinates) for the same object may be different in the plurality of images having different in-focus distances. Thus, the combination needs to follow the alignment of the object positions among the plurality of images.

Accordingly, the image capturing apparatus of this embodiment sets one image to the base image among the plurality of images having different in-focus distances obtained by the focus bracket photography, and other (two or more) images to the search images. The image processor 20 detects the addressed corresponding pixel in the two-dimensional search area corresponding to the addressed pixel in the base image, which two-dimensional search area is calculated for each search image based on the optical parameter values in the plurality of focus bracket shots. Thus, the objects are aligned between the base image and the search image using the thus obtained corresponding points. Thereby, a good deep image can be generated with a small calculation amount.

Figure 16:
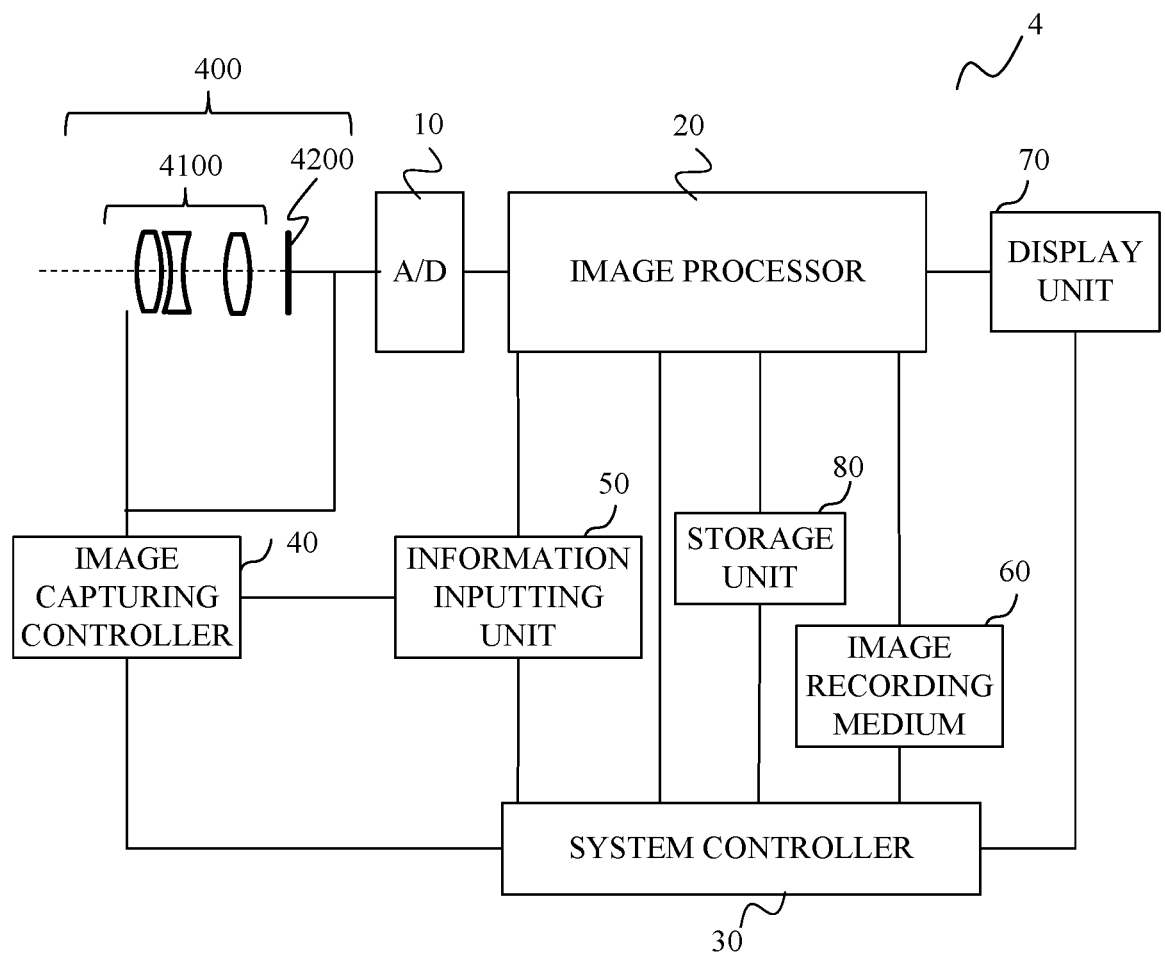
FIG. 16 is a block diagram illustrating a configuration of a stereo image capturing apparatus according to a fourth embodiment of the present invention.

FIG. 16 illustrates a configuration of the image capturing apparatus 4 according to this embodiment. A configuration of the image capturing apparatus 4 according to this embodiment is similar to that of the compound eye image capturing apparatus 1 according to the first embodiment except for an image capturing unit 400, and those elements in this embodiment, which are common or corresponding elements in the first embodiment, will be designated by the same reference numerals.

The image capturing apparatus 4 includes the image capturing unit 400. The image capturing unit 400 includes an image capturing optical system 4100 and an image sensor 4200. The image capturing optical system 4100 and the corresponding image sensor 4200 constitute an image capturing system. The image capturing optical system 4100 includes at least one lens and a focus lens.

The system controller 30 controls the image capturing controller 40 so as to sequentially move the focus lens for image capturing, and makes the image processor 20 generate a plurality of images having different in-focus distances. In other words, the image capturing apparatus 4 can perform the focus bracket photography.

In this embodiment, the optical parameter value of the imaging system used to capture the base image corresponds to the first parameter value, and the optical parameter value of the image capturing system used to capture each of two search images corresponds to the second parameter value. The image processor 20 corresponds to an image processing apparatus mounted on the image capturing apparatus 4, and serves as an area setter and image generator.

Figure 17:
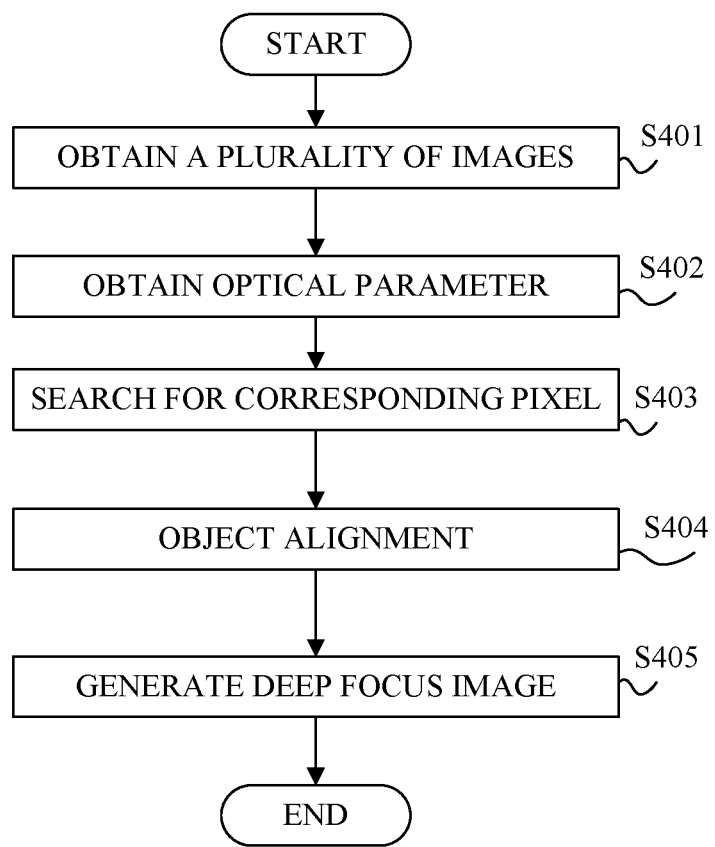
FIG. 17 is an image processing flowchart performed in the stereo image capturing apparatus according to the fourth embodiment.

Referring now to a flowchart in FIG. 17, a description will be given of image processing performed by the image processor 20. The image processor 20 as a computer executes this image processing in accordance with an image processing program as a computer program.

In the step S401, the system controller 30 performs the focus bracket photography in the object space by controlling the image capturing unit 400. Thereby, the image processor 20 generates a plurality of images by performing the image processing described in the first embodiment for the image data from the A/D converter 10. At this time, the system controller 30 captures images totally N times from the in-focus distance at infinity to the in-focus distance with a short distance. N may be an arbitrary number, but is 3 in this embodiment. The image captured with the in-focus distance at infinity is set to the base image, and two other images are set to the search images.

In the step S402, the image processor 20 reads the values of the plurality of optical parameters of the image capturing optical system 4100 for the three image captures from the storage unit 80. The plurality of optical parameters contains the focal length, the entrance pupil position, the front principal point position, and the direction of the optical axis in the image capturing optical system 4100, and the image processor 20 reads a maximum value and a minimum value in a range in which each parameter is variable. The maximum value and the minimum value are those in the range in which each optical parameter can change as the image capturing optical system 4100 moves the focus lens. Where a base optical axis is set to an optical axis of the image capturing optical system 4100 when the object at infinity is focused, the maximum value in the range in which the direction of the optical axis can change is the maximum value of an angle between the base optical axis and the optical axis in each image capturing that moves the focus lens. A minimum value in the range in which the direction of the optical axis can change corresponds to the negative code of the maximum value.

In the step S403, the image processor 20 sets (calculates) the two-dimensional search area in the search image based on the values of the plurality of optical parameters read in the step S402. More specifically, the two-dimensional search area is a partial area that contains all epipolar lines corresponding to all combinations of the maximum and minimum values in the range in which each of the plurality of optical parameters is variable. The direction of the optical axis has a maximum value and a minimum value in two orthogonal directions and this optical axis is orthogonal to the base optical axis. In other words, there are four parameter values representing the direction of the optical axis, and the two-dimensional search area is a partial area that contains all epipolar lines corresponding to all combinations including these four parameter values.

The image processor 20 searches the two-dimensional search area set in the step S403 in the search viewpoint image, for the addressed corresponding pixel corresponding to the addressed pixel in the base image. Thus, the image processor 20 searches the two-dimensional search area in two search viewpoint images for a corresponding pixel (addressed corresponding pixel) corresponding to each pixel (addressed pixel) in the base viewpoint image. When the corresponding pixels in the two (or one) search viewpoint images are detected for all pixels in the base viewpoint image, the flow moves to the next step.

In the step S404, the image processor 20 performs an object alignment process that aligns the objects based on the coordinates of the corresponding points between the base image and the two search images. More specifically, the image processor 20 replaces the pixel value of the pixel located at the same coordinate as that of each pixel (addressed pixel) in the base image in each search image, with the pixel value of the addressed corresponding pixel in the search image corresponding to the addressed pixel. Thereby, the two search images are converted into images in which the same objects are recorded in the pixels with the same coordinates as the coordinate in the base image.

In the step S405, the image processor 20 combines the base image and the two search images into a deep focus image. More specifically, the image processor 20 selects the image having the highest-sharpness partial area among the base image and the two search images, and sets the pixel value of that partial area to the pixel value for the deep focus image. The sharpness may be evaluated, for example, by the space secondary differential. More specifically, by applying a known Laplacian filter to each image, the space secondary differential corresponding to each of the base image and the two search image is generated. Thereafter, the image processor 20 selects one of the base image and the two search images which has the highest pixel value of the partial area in the corresponding space secondary differential image, and sets the pixel value of that partial area to the pixel value of the deep focus value.

Thus, this embodiment combines high-sharpness partial areas among the plurality of (base and search) images and generates a deep focus image, after aligning the object positions in the plurality of images obtained by the focus bracket photography using one image capturing system. In the object alignment, the image processor 20 searches the two-dimensional search area set based on the optical parameter value in the focus bracket photography, for the pixel in the search image corresponding to the pixel of the base image. Thereby, the image processor 20 can aligns the plurality of images with a small calculation amount, and can generate a good deep focus image.

In the description, this embodiment detects the corresponding points for the object alignment before combining a plurality of images obtained by the focus bracket photography. However, this detection of the corresponding points may be applied to the object alignment before combining the plurality of images obtained through the zoom bracket photography. In other words, when the image capturing optical system is driven for zooming, each optical parameter value in the imaging optical system is changed and it is difficult to precisely obtain each optical parameter value. Hence, in aligning the objects in the plurality of images, the corresponding point detection method described in this embodiment (or more specifically the setting method of the two-dimensional search area) is effective.

Each of the above embodiments can precisely detect the corresponding points (target pixel and corresponding pixel) between the first and second images with a reduced processing load, even when the optical parameter value used to capture the first and second images is not precisely obtained.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-097981, filed on May 16, 2016, which is hereby incorporated by reference herein in its entirety.

What is claimed is:

1. An image processing apparatus that processes a first image and a second image so as to detect a corresponding pixel in the second image which corresponds to a target pixel in the first image, the first image and the second image being obtained by image capturing, the first image having a first parameter value, the second image having a second parameter value different from the first parameter value, and the first parameter value and the second parameter value being values of optical parameters of one or more image capturing systems used to capture the first image and the second image, the image processing apparatus comprising:
   one or more processors connected to a memory, the one or more processors being configured to:
   set a two-dimensional search area as a partial area in which the corresponding pixel is to be searched in the second image, based on a predetermined range, the predetermined range determined to include an entire range in which each of the first and second parameter values can change due to tolerances of the one or more image capturing systems; and
   detect the corresponding pixel by searching the two-dimensional search area,
   wherein the two-dimensional search area is set by determining which of a plurality of epipolar lines change in the second image as the first parameter value and the second parameter value change in the predetermined range, and setting the two-dimensional search area to include all epipolar lines that change in the second image as the first parameter value and the second parameter value change in the predetermined range, and wherein the optical parameter includes a position of an entrance pupil in an optical system in the one or more image capturing systems.

2. The image processing apparatus according to claim 1, wherein the optical parameter further includes the direction of an optical axis of the optical system.

3. The image processing apparatus according to claim 1, wherein the optical parameter further includes a focal length of the optical system.

4. The image processing apparatus according to claim 1, wherein the first and second images are images captured from different observing positions, and wherein the optical parameter contains a distance between the observing positions.

5. The image processing apparatus according to claim 1, the one or more processors being configured to:

generate depth information of an object space captured by the one or more image capturing systems, based on the first image and the second image in which the corresponding pixel is detected.

6. The image processing apparatus according to claim 1, the one or more processors being configured to:

generate a combined image or a deep focus image by combining the first image and the second image in which the corresponding pixel is detected.

7. The image processing apparatus according to claim 1, wherein the first image is obtained by a first image capturing system, and the second image is obtained by a second image capturing system that has the optical parameter different from that of the first image capturing system.

8. The image processing apparatus according to claim 7, wherein the first and second image capturing systems include optical systems having focal lengths different from each other.

9. An image capturing apparatus comprising:

one or more image capturing systems each including an optical system and an image sensor; and one or more processors connected to a memory, the one or more processors being configured to:

process the first image and the second image, captured by the one or more image capturing systems, so as to detect a corresponding pixel in the second image which corresponds to a target pixel in the first image, the first image having a first parameter value, the second image having a second parameter value different from the first parameter value, and the first parameter value and the second parameter value being values of optical parameters of the one or more image capturing systems used to capture the first image and the second image set a two-dimensional search area as a partial area in which the corresponding pixel is to be searched in the second image, based on a predetermined range, the predetermined range determined to include an entire range in which each of the first and second parameter values can change due to tolerances of the one or more image capturing systems; and detect the corresponding pixel by searching the two-dimensional search area, wherein the two-dimensional search area is set by determining which of a plurality of epipolar lines change in the second image as the first parameter value and the second parameter value change in the predetermined range, and setting the two-dimensional search area to include all epipolar lines that change in the second image as the first parameter value and the second parameter value change in the predetermined range, and wherein the optical parameter includes a position of an entrance pupil in the optical system.

10. An image processing method configured to process a first image and a second image so as to detect a corresponding pixel in the second image which corresponds to a target pixel in the first image, the first image and the second image being obtained by image capturing, the first image having a first parameter value, the second image having a second parameter value different from the first parameter value, and the first parameter value and the second parameter value being values of optical parameters of one or more image capturing systems used to capture the first image and the second image, the image processing method comprising the steps of:

setting a two-dimensional search area as a partial area in which the corresponding pixel is to be searched in the second image, based on a predetermined range, the predetermined range determined to include an entire range in which each of the first and second parameter values can change due to tolerances of the one or more image capturing systems; and detecting the corresponding pixel by searching the two-dimensional search area, wherein the two-dimensional search area is set by determining which of a plurality of epipolar lines change in the second image as the first parameter value and the second parameter value change in the predetermined range, and setting the two-dimensional search area to include all epipolar lines that change in the second image as the first parameter value and the second parameter value change in the predetermined range, and wherein the optical parameter includes a position of an entrance pupil in an optical system in the one or more image capturing systems.

11. A non-transitory computer-readable storage medium storing an image processing program that enables a computer to execute an image processing method configured to process a first image and a second image so as to detect a corresponding pixel in the second image which corresponds to a target pixel in the first image, the first image and the second image being obtained by image capturing, the first image having a first parameter value, the second image having a second parameter value different from the first parameter value, and the first parameter value and the second parameter value being values of optical parameters of one or more image capturing systems used to capture the first image and the second image, the image processing method comprising the steps of:

setting a two-dimensional search area as a partial area in which the corresponding pixel is to be searched in the second image, based on a predetermined range, the predetermined range determined to include an entire range in which each of the first and second parameter values can change due to tolerances of the one or more image capturing systems; and detecting the corresponding pixel by searching the two-dimensional search area, wherein the two-dimensional search area is set by determining which of a plurality of epipolar lines change in the second image as the first parameter value and the second parameter value change in the predetermined range, and setting the two-dimensional search area to include all epipolar lines that change in the second image as the first parameter value and the second parameter value change in the predetermined range, and
wherein the optical parameter includes a position of an entrance pupil in an optical system in the one or more image capturing systems.

* * * * *